United States Patent
Sayed et al.

(10) Patent No.: US 11,804,866 B2
(45) Date of Patent: Oct. 31, 2023

(54) CIRCUIT ARRANGEMENT AND METHOD FOR ADJUSTING SIGNAL PARAMETERS

(71) Applicant: MOLEX TECHNOLOGIES GMBH, Schonefeld (DE)

(72) Inventors: Ahmed Sayed, Berlin (DE); Helmut Nast, Berlin (DE); Helmut Kautge, Stahnsdorf (DE); Lars Lehmann, Wildau (DE); Raimo Jacobi, Berlin (DE)

(73) Assignee: MOLEX TECHNOLOGIES GMBH, Schönefeld (DE)

( * ) Notice: Subject to any disclaimer, the term of this patent is extended or adjusted under 35 U.S.C. 154(b) by 97 days.

(21) Appl. No.: 17/482,431

(22) Filed: Sep. 23, 2021

(65) Prior Publication Data

US 2022/0131563 A1    Apr. 28, 2022

Related U.S. Application Data

(60) Provisional application No. 63/104,042, filed on Oct. 22, 2020.

(51) Int. Cl.
*H04B 1/04*    (2006.01)

(52) U.S. Cl.
CPC .......... *H04B 1/0483* (2013.01); *H04B 1/0475* (2013.01); *H04B 2001/0408* (2013.01); *H04B 2001/0491* (2013.01)

(58) Field of Classification Search
CPC .......... H04B 1/02; H04B 1/04; H04B 1/0475; H04B 1/0483; H04B 1/06; H04B 1/10; H04B 1/1009; H04B 1/1027; H04B 2001/1054; H04B 2001/1063; H04B 2001/1072; H04B 1/16; H04B 1/38; H04B 2001/3811

See application file for complete search history.

(56) References Cited

U.S. PATENT DOCUMENTS

| | | | |
|---|---|---|---|
| 7,783,318 B2 * | 8/2010 | Wilson | H04B 7/15535 455/69 |
| 8,380,136 B2 | 2/2013 | Helmut et al. | |
| 8,417,286 B2 * | 4/2013 | Gorbachov | H04B 1/0064 455/90.3 |
| 8,718,052 B2 | 5/2014 | Helmut et al. | |
| 8,737,941 B2 * | 5/2014 | Rozenblit | H04B 1/0475 455/127.1 |
| 9,602,148 B2 | 3/2017 | Helmut et al. | |
| 9,628,203 B2 * | 4/2017 | Weissman | H04B 1/40 |
| 10,277,259 B2 | 4/2019 | Ellá et al. | |
| 2018/0219616 A1 | 8/2018 | Nordgran et al. | |

(Continued)

OTHER PUBLICATIONS

Extended European Search Report and Opinion received for EP Application No. 21202365.9, dated Mar. 28, 2022, 9 pages.

*Primary Examiner* — Quochien B Vuong

(57) ABSTRACT

A circuit arrangement capable of adjusting signal parameters of a plurality of signals that is transmitted between one or more terminals and one or more antennas is provided. The circuit arrangement is configured to separate a common signal path for the plurality of signals into a plurality of individual signal paths, wherein two or more signal paths of the plurality of signal paths are configured to carry different single signals. A signal adjusting section is configured to independently adjusting one or more signal parameters for two or more single signals.

20 Claims, 9 Drawing Sheets

(56) References Cited

U.S. PATENT DOCUMENTS

2019/0028135 A1    1/2019  Helmut et al.
2019/0273314 A1    9/2019  Wloczysiak
2021/0105028 A1*   4/2021  Kautge ................ H04B 1/0483

* cited by examiner

CIRCUIT ARRANGEMENT AND METHOD FOR ADJUSTING SIGNAL PARAMETERS

RELATED APPLICATIONS

This application claims priority to U.S. Provisional Appln. No. 63/104,042, filed Oct. 22, 2020, which is incorporated herein by reference in its entirety.

TECHNICAL FIELD

This disclosure is related to the field of adjusting signal parameters, more specifically to the field of adjusting signal parameters of radio signals that are intended to be transmitted by an antenna.

DESCRIPTION OF RELATED ART

Circuit arrangements for attenuation compensation or signal amplification are well known. For instance, a compensation unit in the radio technologies field is used to compensate an attenuation of radio signals between a terminal and an antenna. Document DE 10 2007 004 911 A1 discloses a circuit arrangement for compensating the attenuation occurring in multiple signal paths between a transmitting and receiving device for radio communication and an external antenna used with this transmitting and receiving device.

Document DE 10 2009 027 358 A1 discloses a circuit of signal branches in a circuit arrangement having multiband capability.

Document DE 10 2013 207 898 A1 discloses a circuit arrangement for compensating of signal attenuation during signal transmission having an adjustable signal level amplifying means comprising one or more signal amplifiers for amplifying the transmitted signals with a signal amplification produced by the signal amplifier, an adjusting means for adjusting a resultant signal amplification produced by the signal level amplifying means, a detector arrangement which is designed to detect whether a signal level of the transmitted signals reaches or exceeds a predetermined upper limit value and whether the signal level reaches or falls below a predetermined lower limit value. The detector arrangement is designed to cause the adjusting device to reduce the resulting signal amplification produced by the signal level amplification device when the upper limit value is reached or exceeded. The detector arrangement is also designed, when the lower limit value is reached or undershot to cause the adjusting means to reduce the resulting signal amplification produced by the signal level amplification means.

Document DE 10 2017 219 690 A1 discloses methods and apparatus for amplifying radio signals between a terminal and an antenna or an antenna terminal by means of a circuit arrangement. The circuit arrangement comprises an amplification unit and a detector unit having signal branches formed for different frequency ranges and a power detector unit. A transmission signal received by the terminal is split into a first signal part and one or more second signal parts. The first signal part is applied to the signal branches of the detector unit. In other words, an active transmission band can be identified and transmitted in an active signal path, and a second, transmission band can be detected.

However, as addressed in DE 10 2013 207 898 A1, in mobile communications, the devices are dimensioned to operate under well-defined power conditions that are defined with an upper power threshold and a lower power threshold. An amplification has to be dimensioned to compensate for a maximum of attenuation.

There is a system requirement for mobile communication systems, namely that all terminals send signals with identical receiving field strength to the same base station in order to minimize interferences of different signals and different terminals. However, in a coverage area of one base station, the distance between terminals and a base station may be different, resulting in different field strengths. So, an adjustment of amplification for each individual terminal (and each active signal used for communication) may be necessary.

This system requirement becomes even more challenging when a plurality of signals is used for communication between one or more terminals and one or more base stations. Newer mobile communication standards, for instance UMTS, LTE or 5G New Radio, use for one single data transmission different base stations that are positioned in different geographic positions. Furthermore, the number of terminals, the number of antennas per base station as well as the number of base stations are highly flexible. Furthermore, in a dual connectivity mode, even the standards for data transmission may be different for one single data transmission, e.g. the non-standalone (NSA) mode, in which LTE and 5G New Radio are combined for a dedicated data transmission for one terminal.

The state of the art discloses a circuit arrangement in which one (or more) signal path (branch) is activated that enables the reception and transmission of signals in a plurality of frequency bands. However, in each of the known approaches, there is only one signal path that supports a single-band in an uplink mode. Further, the known approaches are restricted to compensate coupling losses of only one applied (active) call signal at a time.

SUMMARY

The disclosure provides a separate adjustment of more than one signal path in a circuit arrangement for data transmission in the same or in different frequency bands. This adjustment can be independent on whether the radio signal is an uplink signal or a downlink signal to enable full flexibility of the circuit arrangement. For instance, a gain levelling or power levelling for multi-channels in the same band (intra-band) or in different bands (inter-band) can be enabled. Further, it allows multiple signal paths to be regulated separately, and any attenuation can be compensated according to their corresponding loss(es), e.g. an attenuation of radio signals caused by a cable loss or a wireless coupler when using the terminal in a car.

Various embodiments include a circuit arrangement capable of adjusting signal parameters of a plurality of signals that is transmitted between one or more terminals and one or more antennas is provided. The circuit arrangement comprises a detecting unit configured to detect one or more signal parameters of the plurality of signals; a control unit configured to generate one or more control signals based on the detected one or more signal parameters; a signal adjusting section comprising a signal path separation unit configured to separate a common signal path for the plurality of signals into a plurality of individual signal paths, wherein two or more signal paths of the plurality of signal paths are configured to carry different single signals of the received plurality of signals, wherein the signal adjusting section is configured to: receive the plurality of signals at a first port of the signal adjusting section; receive the one or more control signals from the control unit; adjust a characteristic value of one or more components arranged in one or more signal path of the plurality of individual signal paths in the signal adjusting section for independently adjusting one or more signal parameters for two or more single signals of the received plurality of signals based on the one or more control signals to obtain a plurality of signals including the two or more signals with the adjusted signal parameters; and provide the obtained plurality of signals including the two or more signals with the adjusted signal parameters to one or more second ports of the signal adjusting section.

Other embodiments include a method for adjusting signal parameters of a plurality of signals that is transmitted between one or more terminals and one or more antennas. The method comprises the following steps: detecting, by means of a detecting unit of a circuit arrangement, one or more signal parameters of a plurality of signals; generating, by means of a control unit of the circuit arrangement, one or more control signals based on the detected one or more signal parameters; receiving, by means of a signal adjusting section of the circuit arrangement, the plurality of signals; receiving, by means of the signal adjusting section of the circuit arrangement, the one or more control signals from the control unit; separating, by means of a signal path separation unit as part of the signal adjusting unit of the circuit arrangement, a common signal path for the plurality of signals into a plurality of individual signal paths, wherein two or more signal paths of the plurality of signal paths carry different single signals of the received plurality of signals; adjusting, by means of the signal adjusting section of the circuit arrangement, a characteristic value of one or more components arranged in one or more signal paths of the plurality of individual signal paths in the signal adjusting section for independently adjusting one or more signal parameter for two or more single signals of the received plurality of signals based on the one or more control signal to obtain a plurality of signals including the two or more signals with the adjusted signal parameters; and providing, by means of the signal adjusting section of the circuit arrangement, the obtained plurality of signals including the two or more signals with the adjusted signal parameters.

Thus, it is possible to adjust the gain or the attenuation or the frequency range individually and independently for two or more active signals of a plurality of signals.

This independent adjustment may be helpful or necessary in case, these two or more active signals of a plurality of signals have different coupling factors, due to different origins. Now, gain or attenuation may be adjusted independently.

In one example, two or more distinct signals of the plurality of signals should be transmitted to one base station but may have different free space attenuation that would result in different power levels, this independent adjustment may be necessary.

In another example, two active distinct signals of the plurality of signals should be transmitted to different base stations, e.g. in a heterogeneous network ("HetNet"), or when a dual connectivity mode is applied, this independent adjustment may be required. Here, the free space attenuation is different, and the output power level can be adjusted independently.

In another example, in inter-band carrier aggregation data transmission schemes in which two different frequency channels of one base station have different channel properties, such an independent adjustment may be necessary. For instance, a low frequency band signal and a high frequency band signal may be assigned having different channel attenuations or two different frequency channels of one base station have different coupling factors for interfacing the terminal.

As can be appreciated from the above discussion, in some embodiments instead of adjusting two or more signals of the plurality of signals, just one signal of the plurality of signals is adjusted (perhaps because the other signal does not need adjustment).

BRIEF DESCRIPTION OF THE DRAWINGS

The present application is illustrated by way of example and not limited in the accompanying figures in which like reference numerals indicate similar elements and in which:

FIG. 5b illustrates respective transmission functions of an embodiment of the tunable filter depicted in FIG. 5a.

DETAILED DESCRIPTION OF THE PREFERRED EMBODIMENTS

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

Figure 1:
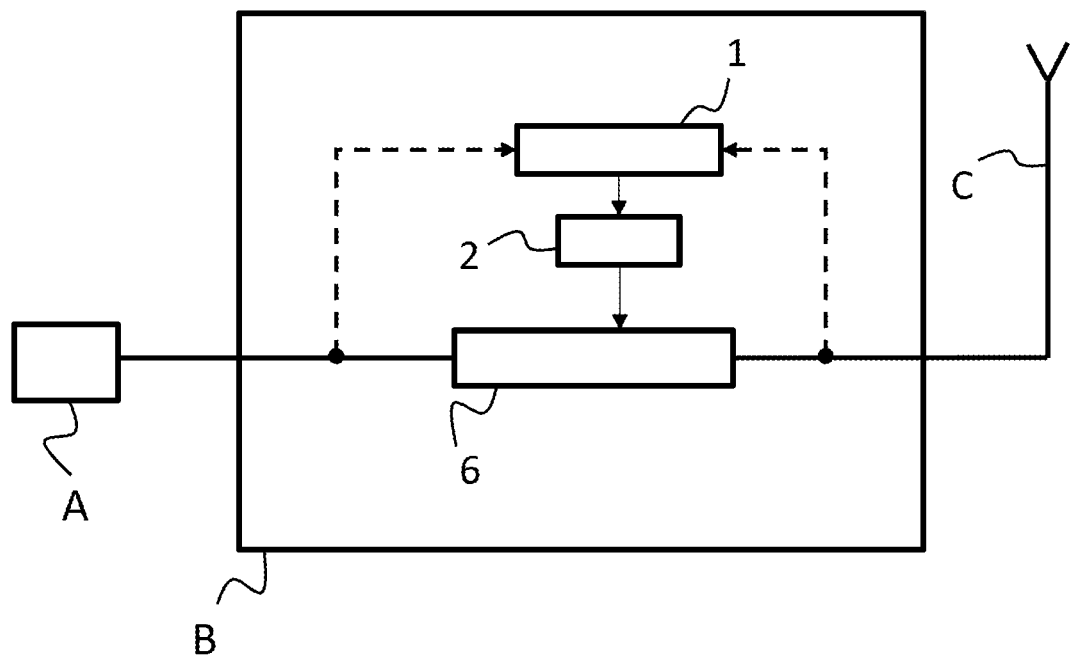
FIG. 1 illustrates a simplified block diagram of a circuit arrangement according to an exemplary embodiment.

FIG. 1 shows an exemplary embodiment of a circuit arrangement B. The circuit arrangement B may be located as an intermediate signal processing component between a terminal A and an antenna C. The terminal A may represent a plurality of terminals (not shown) that may in parallel communicate with the circuit arrangement B. The antenna B may represent a plurality of antennas (not shown) that may in parallel communicate with the circuit arrangement B.

The circuit arrangement B may be used to transmit a plurality of uplink and/or downlink signals between the terminal A and the antenna C.

The circuit arrangement B may comprise a detecting unit 1. As shown in FIG. 1, the detecting unit may comprise a first input port that may be coupled to a signal path carrying the plurality of (uplink) signals that may be arranged between the terminal A and a signal adjusting section 6.

The detecting unit may comprise a second input port that is coupled to a signal path carrying the plurality of (downlink) signals that may be arranged between the antenna C and the signal adjusting section 6. It may be sufficient in one embodiment that the detecting unit 1 comprises only one input port that is coupled either to the signal path that may be arranged between the terminal A and the signal adjusting section 6 or the signal path that may be arranged between the antenna C and the signal adjusting section 6. In another embodiment (not shown in FIG. 1), the detecting unit may be arranged in the signal adjusting section 6.

The detecting unit 1 (irrespective of its concrete position) may be configured to detect one or more signal parameters. The signal may be one of an uplink and/or downlink signal. The detecting unit may be arranged and/or formed as described, for example, in DE 10 2014 213 933 A1 or DE 10 2017 219 690 A1 or as shown and described in below FIGS. 7 to 9. The detecting unit 1 may identify signals in predefined frequency range(s), such as frequency bands and/or frequency channels of a specific communication standard in which the corresponding uplink/downlink signals are transmitted. A signal analysis of the detected uplink/downlink signal may be additionally performed to obtain the signal parameter and/or to identify a standard, for example an analysis of a time course of the uplink/downlink signal. It may be determined whether an uplink/downlink signal is detected according to a TDD method or a FDD method.

A criterion for generating one or more control signals may be the concrete detection of the frequency range, in which the signals are transmitted, e.g. the number of the frequency band. Another criterion may be a detected frequency bandwidth that should be used and on which basis a filter units' characteristic value(s) (cutoff frequency, bandwidth, etc.) may be adjusted. Another criterion may be the detected FDD or TDD schemes, which defines the time sequence or simultaneity of sending and receiving the signals (timing values). Another criterion may be the detected or measured spectral power density which defines allowable input and output levels and on which basis attenuation or gain values as characteristic values may be adjusted.

The circuit arrangement B may comprise a control unit 2. The control unit 2 may have a control input that may be connected to an output of the detecting unit 1. The control unit 2 may be configured to generate one or more control signal based on the detected one or more signal parameter and to provide the one or more control signal to one or more output port of the control unit 2.

The generated control signal may be a digital representation of the detected signal parameter(s) provided to the signal adjustment section 6 to adjust a characteristic value of one or more components for adjusting the signal parameter.

The generated control signal may be the result of a comparison that may be made by the detecting unit 1 or the control unit 2 that may be provided to the signal adjustment section 6 to adjust a characteristic value of one or more components for adjusting the signal parameter.

The generated control signal may be a generated adjustment-command based on the detected signal parameters provided to the signal adjustment section 6 to adjust a characteristic value of one or more components for adjusting the signal parameter.

The generated control signal may contain parameter information for the signal adjustment section 6 to adjust a characteristic value of one or more components for adjusting the signal parameter. The control signal may be derived from a converted version of the detected signal parameter(s).

The circuit arrangement B may comprise the signal adjusting section 6. The signal adjusting section 6 may comprise a signal path separation unit (not shown) that may be configured to separate a common signal path for the plurality of signals into a plurality of individual signal paths, wherein two or more signal paths of the plurality of signal paths are configured to carry different single signals of the received plurality of signals. The signal adjusting section 6 may be configured to receive the plurality of signals at a first port of the signal adjusting section 6. The signal adjusting section 6 may further be configured to receive the one or more control signals from the one or more output port of the control unit 2 at one or more control input ports of the signal adjusting section 6. The signal adjusting section 6 may further be configured to adjust a characteristic value of one or more components (not shown in FIG. 1) arranged in one more signal paths of the plurality of individual signal paths of the signal adjusting section for independently adjusting one or more signal parameter for two or more single signals of the received plurality of signals based on the received one or more control signals to obtain a plurality of adjusted signals 6. This means that the control signal(s) may comprise sufficient information that lead to a direct or indirect adjusting of the signal parameters of two or more distinct signals of the plurality of signals. The signal adjusting section 6 may further be configured to provide the plurality of signals having the one or more adjusted signal parameter to one or more second port of the signal adjusting section 6.

This circuit arrangement B may enable a signal parameter adjustment, such as power adjustment of two or multi-signals of one frequency band (intra-band) or of different frequency bands (inter-band) in an individual (separate) manner. This new concept may overcome the restriction of compensating coupling losses of only one applied signal at a time by using multi-signal paths that are separately adjusted (regulated) and their disadvantageous signal criteria, such as attenuation, cross-talk, interferences, may be compensated according to their corresponding coupling loss(es) between the terminal A and the antenna C.

The adjustment of signal parameter(s) may be made independent on whether the signal—whose signal parameter is to be adjusted—is an uplink signal or a downlink signal. This allows the following scenarios.

In case two (active) uplink signals are transmitted in different frequency bands (=inter-band carrier aggregation), an adjustment of downlink signals may be made in order to balance uplink signals and downlink signals. For instance, if the circuit arrangement is located close to the base station to which the uplink signals should be transmitted, both uplink signals may be attenuated by means of one or more attenuation units (as component), e.g. if a lower threshold value is undershoot. For instance, if the circuit arrangement is located far away from the base station to which the uplink signals should be transmitted, the downlink signals may not be attenuated by means of one or more attenuation units (as component) and the uplink signals may be attenuated by means of one or more attenuation units (as component) only, if an upper threshold value is exceeded.

In another case two (active) uplink signals may be transmitted in different channels (e.g. different component carriers) of the same frequency band (=intra-band carrier aggregation), channel filter units as components may be used to separate the two channels. The characteristic values of these channel filter units may be adjusted. For instance, if the circuit arrangement is located close to the base station to which the uplink signals should be transmitted, both uplink signals may be attenuated, e.g. if a lower threshold value is undershoot. For instance, if the circuit arrangement is located far away from the base station to which the uplink signals should be transmitted, the downlink signals may not be attenuated and the uplink signals may be attenuated only, if an upper threshold value is exceeded.

If the terminal starts a signal transmission (e.g. a phone call), the detecting unit may start operating and may monitor the detected frequency ranges (such as frequency bands or frequency channels) and the power values and/or timing values of the signals. Based on the detected signal parameters, the signal adjusting section may start the adjustment in order to adjust characteristic values of individual components, such as gain, attenuation, frequency range, activation states (of activation units) and the selection of further antennas to meet predefined requirements such as maximum power levels, minimum power levels, channel bandwidths, etc.

Figure 2:
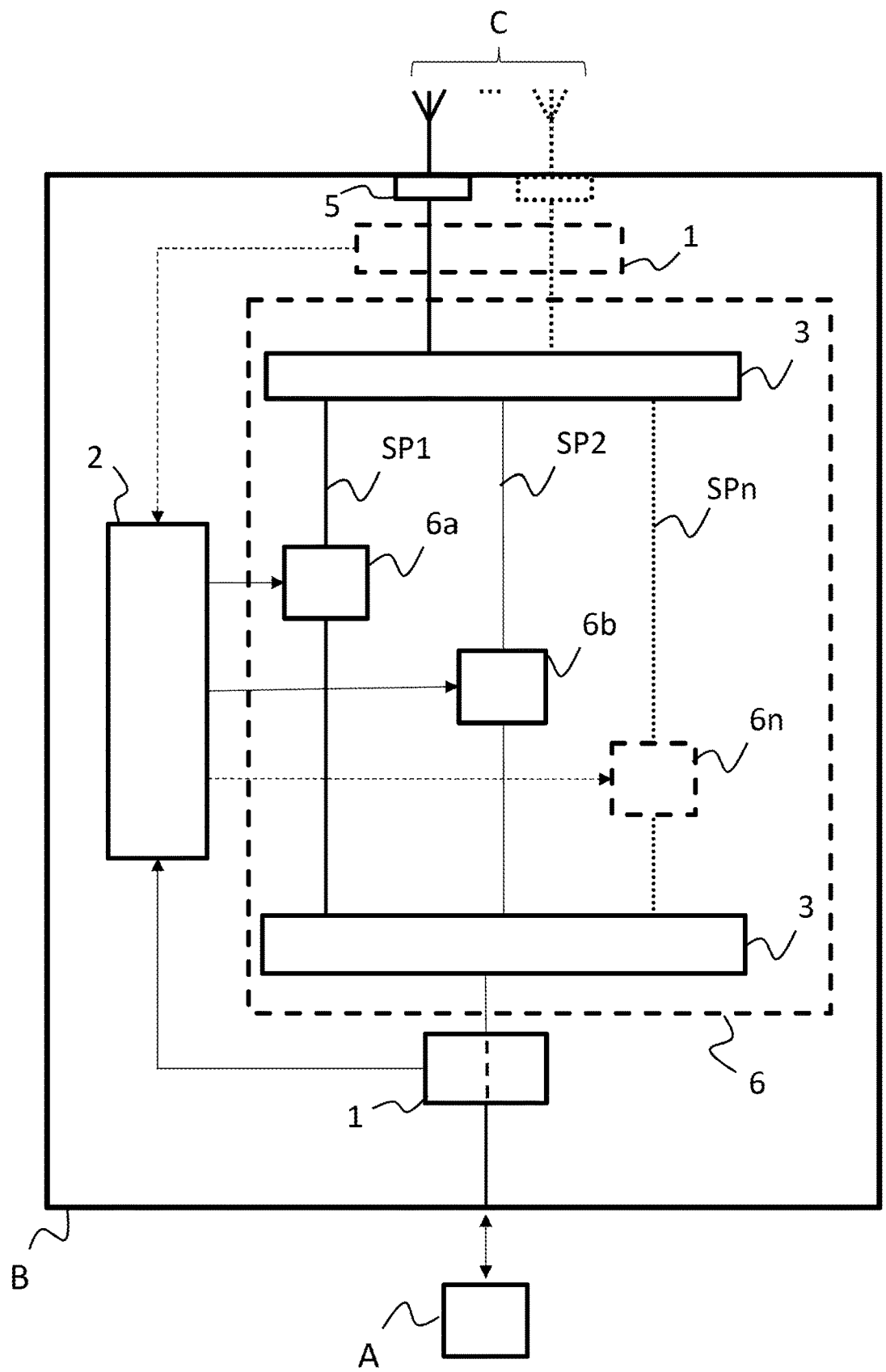
FIG. 2 illustrates a simplified block diagram of a circuit arrangement according to an exemplary embodiment.

FIG. 2 shows another exemplary embodiment of a circuit arrangement B. In particular, FIG. 2 shows a schematic block diagram of a circuit arrangement B for the transmission of uplink and downlink signals between one or more terminals A and two antennas C. Although not shown in FIG. 2, the circuit arrangement B may be capable of transmitting uplink and downlink signals between a plurality of terminals A and the plurality of the antennas C. In such an alternative embodiment (not shown in FIG. 2) there may be one terminal-interface 4 that is connected to the plurality of terminals A.

The circuit arrangement B may be configured to enable a wireless or a wired signal connection to the terminal A. Furthermore, circuit arrangement B may comprise antenna-interfaces 5, each antenna C of the plurality of antennas C may be connected to one of the antenna-interfaces 5. In an alternative embodiment (not shown in FIG. 2) there may be one antenna-interface 5 that may be connected to the plurality of antennas C.

The circuit arrangement B may comprise several signal paths SPs, wherein in FIG. 2 exemplarily a first signal path SP1, a second signal path SP2 and a nth signal path SPn are visually represented. In FIG. 2, these signal paths SP may be either uplink signal paths or downlink signal paths. The circuit arrangement B may be capable of bidirectionally transmitting signals, namely uplink signals and downlink signals. In case, a signal path SP is not used (is not required), it may be deactivated. In case a further signal path SP is needed (required), it may be activated. For the activation and deactivation of signal paths, amplifiers, attenuators, switches and/or filter unit are used. Different amplifiers may be used for an uplink and a downlink signal path.

The signal paths SP1, . . . , SPn shown in FIG. 2 may be used in particular for frequency-range-specific uplink and/or downlink paths.

For example, signals from a frequency range of 832 MHz to 862 MHz (first uplink frequency range, 3GPP FDD Mobile Band 20) may be transmitted via the first uplink path SP1 and signals from the frequency range 791 MHz to 821 MHz (first downlink frequency range, 3GPP FDD Mobile Band 20) may be transmitted via a first downlink path (not shown in FIG. 2).

For example, signals from a frequency range of 880 MHz to 915 MHz (second uplink frequency range, 3GPP FDD Mobile Radio Band 8) may be transmitted via the second uplink path SP2 and signals from the frequency range 925 MHz to 960 MHz (second downlink frequency range, 3GPP FDD Mobile Radio Band 8) may be transmitted via a second downlink path (not shown in FIG. 2).

For example, signals from a frequency range of 2570 MHz to 2620 MHz (Nth uplink frequency range, TDD mobile radio Band 38) may be transmitted via the nth uplink path SPn and signals from the frequency range 2570 MHz to 2620 MHz (Nth downlink frequency range, TDD mobile radio Band 38) may be transmitted via an nth downlink path (not shown in FIG. 2). Further signal paths SP can be set up accordingly for the transmission of signals from other mobile radio bands (e.g. Band 1, Band 3, Band 5, Band 40 or others).

The signal adjusting section 6 is shown in dashed line and comprises exemplary N signal adjusting units 6a, 6b, 6n as components. Each signal adjusting unit 6a, 6b, 6n may be arranged in one respective uplink and/or downlink path SP1, SP2, SPn. However, also a plurality of signal adjusting units may be arranged per signal path SP (see FIG. 3). By means of these signal adjusting units 6a, 6b, 6n, a signal parameter of the signals transmitted via the corresponding signal path SP1, SP2, SPn may be adjusted by adjustment of a characteristic value of the signal adjusting units 6a, 6b, 6n. These signals to be adjusted may be transmitted from a terminal-interface (not shown) to the antenna-interface 5 of the circuit arrangement B.

The signal adjusting units 6a, 6b, 6n may serve to activate and deactivate the signal paths SP1, SP2, SPn.

The signal adjusting units 6a, 6b, 6n may be part of an amplifier section, and/or a filter section, and/or an attenuation section and/or switching unit of the signal adjustment section 6. Each signal adjusting unit 6a, 6b, 6n may be arranged in a frequency-range-specific section of signal paths SP1, SP2, SPn, respectively, and each of these frequency-range-specific sections serve to transmit uplink signals from exactly one uplink frequency range or to transmit downlink signals from exactly one downlink frequency range.

FIG. 2 further shows the control unit 2 of the circuit arrangement B, which may be a microcontroller. By means of this control unit 2, each signal adjusting unit 6a, 6b, 6n can be controlled using respective control signals generated by the control unit 2. In other words: The control unit 2 may generate the respective control signals to adjust a characteristic value of one or more signal adjusting units 6a, 6b, 6n of the signal adjustment section 6 in the signal path SP1, SP2 and/or SPn. In FIG. 2, N distinct control signals may be generated by the control unit 2, each of these control signals may be provided to one of the signal adjusting units 6a, 6b, 6n. However, other arrangements are possible. Signal adjusting units 6a, 6b, 6n may share a common control signal (not shown in FIG. 2).

For instance, one of the signal adjusting units 6a, 6b, 6n can be activated and/or deactivated by means of the control unit 2 through the generated control signal(s). In the activated state of one of the signal adjusting units 6a, 6b, 6n, the corresponding signal path SP1, SP2, SPn may be activated and signal transmission via the corresponding uplink or downlink path SP1, SP2, SPn is possible. The characteristic value of the respective signal adjusting units 6a, 6b, 6n may be either a fixed value (predetermined) or may be variable (adjustable) in the activated state. In the deactivated state of one of the signal adjusting units 6a, 6b, 6n, the corresponding signal path SP1, SP2, SPn may be deactivated and signal transmission via the corresponding uplink or downlink path SP1, SP2, SPn may not be possible or is highly attenuated (above a threshold attenuation, e.g. 50 dB or 100 dB).

For instance, one of the signal adjusting units 6a, 6b, 6n can be gain-controlled by means of the control unit 2 through the generated control signal(s). If a gain value as a characteristic value of one of the signal adjusting units 6a, 6b, 6n should be increased, the control signal presents a respective gain-increase command to the signal adjusting unit 6a, 6b, 6n and an amplitude or power value as a signal parameter of a signal transmitted via the corresponding signal path SP1, SP2, SPn is increased by increasing the gain of the signal path, respectively. If a gain value as a characteristic value of one of the signal adjusting units 6a, 6b, 6n should be decreased, the control signal presents a respective gain-decrease command to the signal adjusting unit 6a, 6b, 6n and an amplitude or power value as a signal parameter of a signal transmitted via the corresponding signal path SP1, SP2, SPn may be decreased by decreasing the gain of the signal path, respectively. The gain parameter for the respective signal adjusting unit 6a, 6b, 6n may be either a fixed value (predetermined) or may be variable (adjustable).

For instance, one of the signal adjusting units 6a, 6b, 6n can be attenuation-controlled by means of the control unit 2 through the generated control signal(s). If an attenuation value as a characteristic value of one of the signal adjusting units 6a, 6b, 6n should be increased, the control signal may present a respective attenuation-increase command to the signal adjusting unit 6a, 6b, 6n and an amplitude or power value as a signal parameter of a signal transmitted via the corresponding signal path SP1, SP2, SPn may be decreased by increasing the attenuation value of the signal path, respectively. If an attenuation value as a characteristic value of one of the signal adjusting units 6a, 6b, 6n should be increased, the control signal may present a respective attenuation-decrease command to the signal adjusting unit 6a, 6b, 6n and an amplitude value or power value as a signal parameter of a signal transmitted via the corresponding signal path SP1, SP2, SP3 may be increased by decreasing the attenuation value of the signal path, respectively. The attenuation parameter for the respective signal adjusting unit 6a, 6b, 6c may be either a fixed value (predetermined) or may be variable (adjustable).

For instance, a frequency range value as a characteristic value of the signal adjusting units 6a, 6b, 6n may be controlled by means of the control unit 2 through the generated control signal(s). If a frequency range value as a characteristic value of one of the signal adjusting units 6a, 6b, 6n should be adjusted (such as a cutoff frequency, a frequency bandwidth, a slope), the control signal may present a respective command to the signal adjusting unit 6a, 6b, 6n and the corresponding frequency value as characteristic value of the corresponding signal path SP1, SP2, SPn can be adjusted, respectively. The adjustment of the frequency value of the signal path may be preconditioned for the adjustment of the power value of the signal to be transmitted via this signal path SP1, SP2, SPn. If a frequency range value as a characteristic value of one of the signal adjusting units 6a, 6b, 6n should be set to a specific value (such as a cutoff frequency, a frequency bandwidth, a slope), the control signal presents a respective command to the signal adjusting unit 6a, 6b, 6n and the corresponding power value as a signal parameter of a signal transmitted via the corresponding signal path SP1, SP2, SPn will be set, respectively. Thus, the frequency range value as a characteristic value for the respective signal adjusting unit 6a, 6b, 6n may either be a fixed value (predetermined) or may be variable (adjustable).

FIG. 2 further shows that the circuit arrangement B may include two signal separation units 3, here preferably designed as multiplexers for providing plural uplink and/or downlink paths. In particular, a first multiplexer may be arranged at the antenna-interface 5 and a second multiplexer may be arranged at the terminal-interface 4. The multiplexers can serve as a frequency band splitter.

The signal separation units 3 may comprise a plurality of filter devices, low-pass filter(s), band-pass filter(s) and high-pass filter(s) as well as power dividers, switches, circulators or further elements, e.g. elements designed as duplexers, diplexers, triplexers, etc. in order to filter out the downlink signals to be transmitted via downlink paths (not shown in FIG. 2) from an antenna-interface 5. The antenna signals derived from the antenna-interface 5 may be transmitted by a base station (not shown) and may be received by one or both antennas C.

The signal separation units 3 can also serve as signal combiners. This allows uplink or downlink signals transmitted via the uplink and/or paths SP1, SP2, SPn to be combined to form one or more resulting signal, which is then transmitted to the antenna-interface(s) 5. This resulting signal can then be transmitted by an antenna C, e.g. to a base station (not shown).

The other signal separation unit 3 (arranged at the terminal-interface 4) can serve as a frequency band splitter. In particular, this other signal separation unit 3 can also comprise several filter devices, such as low-pass filters, several bandpass filters and high-pass filters as well as power splitters, switches, circulators or further elements, e.g. elements designed as duplexers, diplexers, triplexers, etc., in order to filter out the uplink signals to be transmitted via the uplink paths SP1, SP2, SPn from one or more terminals A, e.g. via a terminal-interface (not shown in FIG. 2). This other signal separation unit 3 can also serve as a signal combiner. In particular, uplink and/or downlink signals transmitted via the respective uplink and/or downlink paths (not shown in FIG. 2) can be combined to one or more resulting signals, which is then transmitted to the terminal A.

It is further shown that the circuit arrangement B may comprise a detecting unit 1 having an output port being connected to the control unit 2. In dashed lines there may also be shown a detecting unit 1 that may additionally or alternatively be included in the circuit arrangement B. The detecting unit 1 can be arranged on a common signal path near the output port to the terminal A and/or on a common signal path near the output port to the antenna(s) C Additionally or alternatively, the detecting unit may be arranged at one or more of the signal paths SP, either an uplink signal path or a downlink signal path.

The detecting unit 1 may comprise a signal coupling unit (as a part of the item 1 in FIG. 2), which can be designed, for example, as a directional coupler or a power divider. The signal path on which the detecting unit 1 may be connected with an input port connects the terminal A with this other signal separation unit 3. This signal path can be a section of a downlink signal path or an uplink signal path, whereby this section can be designed as a signal path section which is not specific to the frequency range and has for instance a broadband signal frequency range. By means of the detecting unit 1, it can for instance be detected whether one or more uplink and/or downlink signal(s) is/are present on the signal path between the terminal A and the other separation unit 3. Additionally, an overall power value may be detected as a signal parameter of the plurality of signals by the detecting unit 1. The exemplary embodiment of the circuit arrangement B as shown in FIG. 2 may include a detecting unit 1 capable of detection and identification of uplink and/or downlink signals.

This uplink signal can be generated by the terminal A and may be received by a terminal-interface. Furthermore, the uplink signal, in particular the uplink frequency range and/or the transmission standard of the uplink signal, can be identified by means of the detecting unit 1 for signal transmission adjustment.

If, for example, an uplink signal from a first uplink frequency range is detected and identified by the detecting unit 1, the signal adjusting unit 6*a* in the first uplink path SP1 may be activated and its characteristic value is adjusted, in particular by using a control signal generated by means of the control unit 2. In this way, an activated state of the first uplink path SP1 is established and adjusted to a preferred signal parameter value.

It is possible that the control unit 2 adjusts characteristic values of the signal adjusting units 6*a*, 6*b*, 6*n* in dependence on a previously known assignment between different uplink signals and/or downlink paths. The control unit 2 then adjusts the characteristic value of the corresponding signal adjusting unit 6*a*, 6*b*, 6*n* accordingly. The assignment may be stored, for example, in a memory device (not shown) of circuit arrangement B, in particular the control unit 2.

Furthermore, it is possible that if an uplink signal is already detected, a further uplink signal may be added. One or more of the signal adjusting units 6*a*, 6*b*, 6*n* may then activate and/or adjust the respective signal path SP1, SP2, SPn by means of the control unit 2.

For example, it is possible that two or more signal adjusting units 6*a*, 6*b*, 6*n* will be activated and adjusted, if exactly one uplink signal is detected by means of detecting unit 1. However, it is also possible, that one or more signal adjusting units 6*a*, 6*b*, 6*n* may be deactivated in such a case.

The circuit arrangement B of FIG. 2 may also include one or more further signal processing devices for uplink signal detection (not shown).

Figure 3:
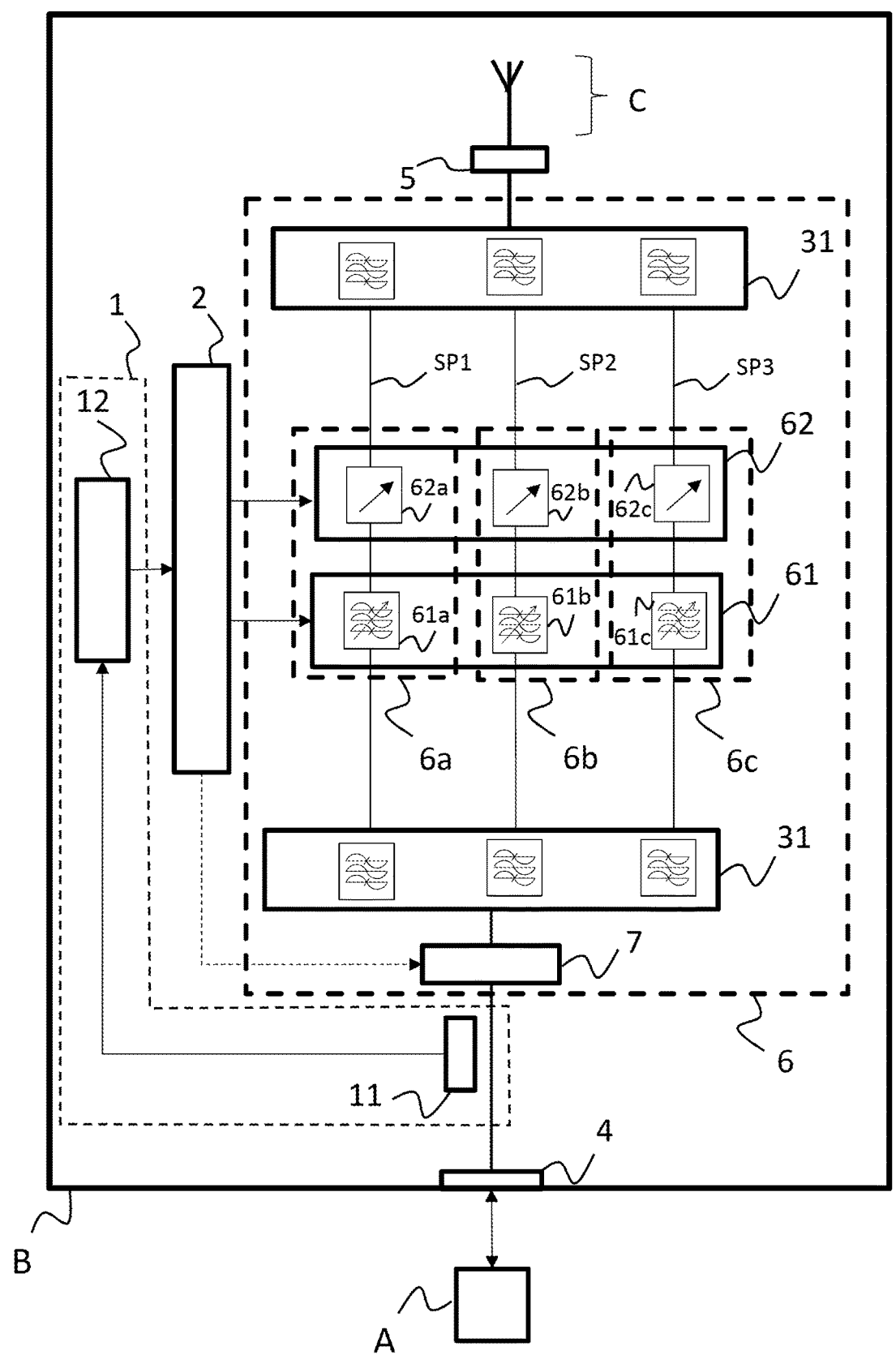
FIG. 3 illustrates a simplified block diagram of a circuit arrangement according to an exemplary embodiment.

FIG. 3 shows a schematic block diagram of a circuit arrangement B for the transmission of uplink and downlink signals between one or more terminals A and one or more antennas C in a further version. FIG. 3 shows only one terminal A and one antenna C, whereby the circuit arrangement B can transmit uplink and downlink signals between this terminal A and the antenna C. The circuit arrangement B shown in FIG. 3 is essentially designed like the circuit arrangement B shown in FIG. 2. Therefore, to avoid unnecessary repetitions, the corresponding explanations of FIG. 2 are also valid for this FIG. 3 unless otherwise stated.

Additionally, a terminal-interface 4 may be arranged between the terminal A and the signal adjusting section 6. This terminal-interface 4 may establish a wired or wireless transmission to/from the terminal A.

Additionally, an optional attenuation unit 7 may be arranged between the terminal interface 4 and a signal path separation unit 3, which in FIG. 3 is represented as a filter-bank 31.

In contrast to the embodiment as shown in FIG. 2, antenna C may be part of the circuit arrangement B and so, the circuit arrangement B may include the antenna 5. The circuit arrangement B exemplarily comprises two uplink signal paths SP1, SP2 and one downlink signal path SP3 for simplicity. The number of uplink signal paths or downlink signal paths is not limited in this specification.

In FIG. 3 it is shown that the detecting unit 1 is illustrated as a signal coupler 11 and a signal parameter detector 12. The signal coupler 11 may be positioned on a common signal path between the terminal-interface 4 and the optional attenuation unit 7.

The optional attenuation unit 7, may have an adjustable attenuation value as a characteristic value in order to adjust an overall attenuation value of (all signals of) the plurality of signals so that respective signal parameters of all signals of the plurality of signals transmitted between the terminal A and the antenna C may be adjusted at once. This is a dependent adjustment of signal parameters and different from the independent adjustment of one or more signal parameters for two or more signals.

The control unit 2 may also generate a control signal directly applicable to the attenuation unit 7. Thus, the attenuation unit 7 may be controlled via the control unit 2, especially to adjust an attenuation factor in a common signal path in which all signals of the plurality of signals are transmitted. The common signal path may be established between the terminal-side interface 4 and a terminal-side port of the attenuation unit 7. The common signal path may alternatively or additionally be established between the antenna-side interface 7 and an antenna-side port of the separation unit 3 (here filter-bank 31) and the attenuation unit 7 may be located there (not shown in FIG. 3). Despite the concrete position of the attenuation unit 7, the attenuation unit 7 is configured to attenuate each of the plurality of signals at once with the adjustable attenuation factor, being adjusted by the control unit 2.

In an alternative embodiment (not shown in FIG. 3), the signal coupler 11 can be arranged at different positions within the circuit arrangement B. It is possible, for example, that the signal coupler 11 may be arranged and/or designed in such a way that a signal is coupled out of a further connection signal path positioned between the antenna-interface 5 and the first separation unit 3. Furthermore, several signal couplers 11 may be arranged and/or designed in such a way that signals from the sections of the uplink signal paths SP1, SP2, SP3 are decoupled.

The adjusting section 6 is shown in greater details in FIG. 3. Adjustable (tunable) filter units 61*a*, 61*b*, 61*c* in the signal adjusting section 6 may be additionally or alternatively arranged in each respective signal path SP1, SP2, SP3. By means of these tunable filter unit 61*a*, 61*b*, 61*c*, frequency range values of each signal path as a characteristic value can be adjusted so that the power values as signal parameters for the signals transmitted via the corresponding path SP1, . . . , SP3 can be adjusted (tuned) independently.

The tunable filter units 61*a*, 61*b*, 61*c* which may be part of a filter section 61 of the signal adjustment section 6 are each arranged in a frequency-range-specific section of signal paths SP1, SP2, SP3, respectively, and these frequency-range-specific sections each serving to transmit signals from exactly one frequency range. An adjustable frequency range value as characteristic value of a tunable filter unit 61*a*, 61*b*, 61*c* may be a cut-off frequency value (maximum and/or minimum), a frequency bandwidth value, a frequency channel value and/or a frequency band value.

Power level setting units 62*a*, 62*b*, 62*c* in the signal adjusting section 6 may additionally or alternatively be arranged in each respective signal path SP1, SP2, SP3. By means of these power level setting units 62*a*, 62*b*, 62*c*, a gain value or an attenuation value as a characteristic value can be set and/or adjusted for each signal path SP1, SP2, SP3 for independently adjusting a power level or an amplitude level of the signals transmitted via the corresponding signal path SP1, . . . , SP3.

In operation, the detecting unit 1 may detect a frequency range and a power value of one channel, e.g. a component carrier. The control unit 2 may adjust a filter unit according to the detected signal frequency range. Additionally, the control unit may adjust a gain or attenuation value of a power level setting unit corresponding to the detected signal parameter(s) (e.g. power, timing, frequency values). Thus, the gain or power value of two or more signals will be adjusted. This operation may be applicable to a data transmission using one or more frequency channels (inter-band or intra-band carrier aggregation or dual connectivity) for uplink and/or downlink signals.

Following operation scenarios may occur:
1) For instance, if the detecting unit 1 detects that the input power (of one or more signals) of the plurality of signal exceeds or undershoots a predefined power value, all signal paths may individually be adjusted in that the gain value of respective power level setting units 62a, 62b, 62c is decreased (if exceeded) or is increased (if undershoot) or in that the attenuation value of the respective power level setting units 62a, 62b, 62c is increased (if exceeded) or is decreased (if undershoot) in order to protect the circuit arrangement B from over-powering that may result in a destruction of parts of the circuit arrangement B, e.g. due to heat dissipation.
2) For instance, if the detecting unit 1 detects that the input power of a specific signal of the plurality of signal exceeds or undershoots a predefined value, the signal path may be adjusted in that the gain value of respective power level setting units 62a, 62b, 62c are decreased or in that the attenuation value of the respective power level setting units 62a, 62b, 62c are increased in order to protect the circuit arrangement B from over-powering that may result in a destruction of parts of the circuit arrangement B, e.g. due to heat dissipation.
3) For instance, if the detecting unit 1 detects that the input power of a specific signal interferes with other signals of the plurality of signals, the power values of one or two or more signals of the plurality of signals are adjusted to reduce the interference.

FIG. 3 also shows the control unit 2 of the circuit arrangement B, which can be designed as a microcontroller. By means of this control unit 2, each of the filter units 61a, 61b, 61c and/or each of the power level setting units 62a, 62b, 62c can be controlled using respective control signals generated by the control unit 2. For instance, the gain values or the attenuation value of the power level setting units 62a, 62b and 62c can be set or varied (adjusted) in the activated state of the signal paths SP1, SP2, SP3. Alternatively or additionally, the frequency range values of the tunable filter units 61a, 61b and 61c can be set or varied (adjustable) in the activated state of the signal paths SP1, SP2, SP3, e.g. by adjusting a minimum cutoff-frequency or a maximum cutoff frequency, or a bandwidth value or a slope value or an order value.

FIG. 3 further shows that the circuit arrangement B may include a filter bank 31 as the signal separation unit (FIG. 2). The filter bank 31 may be a multiplexer comprising several filter units. Each filter unit of the filter-bank 31 can be designed, for example, as low-pass, band-pass or high-pass filter(s). The filter-bank 31 being multiplexers may be designed to provide the uplink and downlink signals of the plurality of signals which are transmitted via the corresponding paths SP1, SP2, SP3.

In an embodiment (not shown in FIG. 3), the filter bank 31 may comprise one or more adjustable (tunable) filter units, preferable one tunable filter unit per distinct signal path SP1, SP2, SP3. A respective control signal for each tunable filter unit (or for more than one tunable filter unit) in the filter bank 31 may be provided from the control unit 2. In such a circuit arrangement B, the adjustable filter units 6a to 6c can be omitted which results in less circuit arrangement complexity and reduces signal attenuation.

Figure 4:
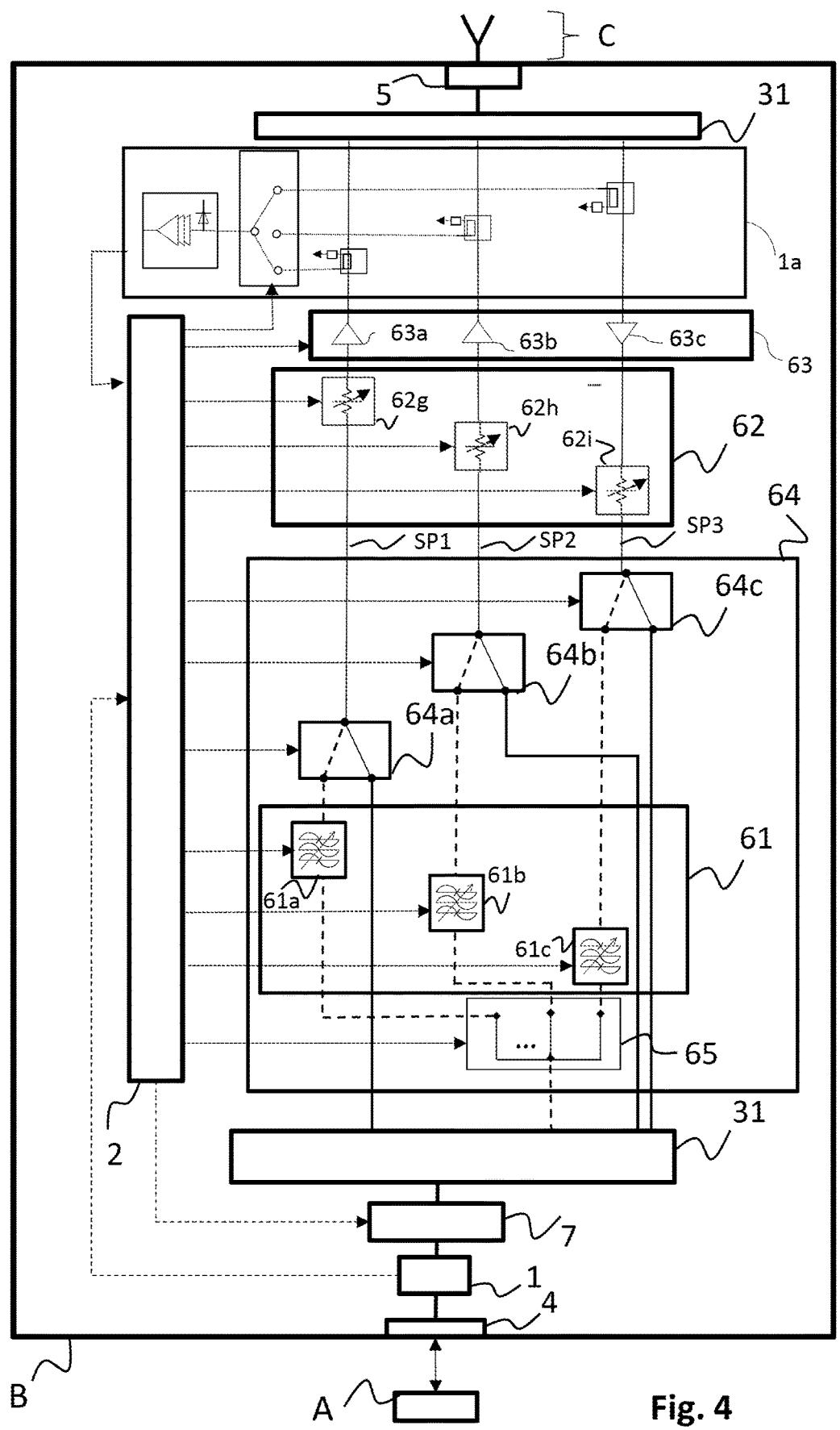
FIG. 4 illustrates a simplified block diagram of a circuit arrangement with carrier aggregation according to an exemplary embodiment.

FIG. 4 shows an exemplary embodiment of a schematic block diagram of a circuit arrangement B for the transmission of two exemplary uplink signals SP1, SP2 and one downlink signal SP3 between one or more terminals A and one or more antennas C in. The circuit arrangement B shown in FIG. 4 may be built like the circuit arrangement B shown in FIG. 2 or FIG. 3. Therefore, to avoid unnecessary repetitions, the corresponding explanations of FIG. 2 and FIG. 3 may also be valid for the embodiment of FIG. 4 unless otherwise stated.

In addition to the embodiment of FIG. 3, the embodiment of FIG. 4 shows amplifier units with a constant gain useful as activation units 63a, 63b, 63c of a signal path activation section 63 in the signal adjusting section 6 that may be arranged in each respective signal path SP1 to SP3. These activation units 63a, 63b, 63c (in contrast to adjustable amplifier units 62d, 62e, 62f) may have a constant gain. Upon activation of an activation unit 63a, 63b, 63c, the constant gain may be applied in the corresponding signal path SP1, SP2, SP3. By means of these activation units 63a, 63b, 63c, the signals transmitted via the corresponding paths SP1 to SP3, which may be transmitted from/to the terminal-interface 4 on the terminal side to/from the antenna-interface 5 on the antenna side, can serve to activate and deactivate the signal paths SP1 to SP3. The activation states of the activation units 63a, 63b, 63c may be respective characteristic values.

Activation units 63a, 63b, 63c may be each arranged in a frequency-range-specific section of signal paths SP1, SP2, SP3, respectively, and each of these frequency-range-specific sections serving to transmit signals from exactly one frequency range. As illustrated in FIG. 4, the signal paths SP1, SP2 may be uplink signal paths and signal path SP3 may be a downlink signal path, as shown by the indicated opposite signal directions when considering respective activation unit 62a, 62b or activation unit 63c.

FIG. 4 shows an exemplary embodiment of a circuit arrangement B with carrier aggregation in uplink mode. The carrier aggregation may be an inter-band carrier aggregation, or an intra-band carrier aggregation that can be activated by means of the carrier aggregation selection section 64. The carrier aggregation selection section may also comprise carrier aggregation switching units 64a, 64b, 64c which can be switched between inter-band carrier aggregation, as shown in solid lines, or intra-band carrier aggregation, as shown in dashed lines.

Respective signal paths SP1, SP2, SP3 useful in intra-band carrier aggregation (for instance in frequency band 8 with two uplink channels and one downlink channel) are shown in dashed lines. A respective switch 65 with split functionality may be used to split the signals into three signal paths. Each of these signal paths may comprise a tunable filter unit 61a, 61b, 61c as described in above FIG. 3. So, for each of these signal paths (shown in dashed lines), a frequency channel value, such as cutoff frequency, bandwidth, etc., as the characteristic value may be adjusted by means of the control unit 2.

In FIG. 4, there are attenuation units 62g, 62h, 62i shown (instead of power level setting units 62a, 62b, 62c of FIG. 3). These attenuation units 62g, 62h, 62i in the signal adjusting section 6 may be arranged in each respective signal path SP1, SP2, SP3. By means of these attenuation units 62g, 62h, 62i, an attenuation value as a characteristic value can be set and/or adjusted for each signal path SP1, SP2, SP3 for independently adjusting a power level or an amplitude level of the signals transmitted via the corresponding signal path SP1, . . . , SP3. The attenuation units 62g, 62h, 62i are located in frequency-specific portion of the signal paths SP1, SP2, SP3. By adjusting an attenuation value as the characteristic value, desired attenuations can be set for adjusting an amplitude or power value as signal parameter of signals transmitted over these signal paths SP1, SP2, SP3.

In FIG. 4, besides the detector unit 1, there may be a root mean square detector unit 1a configured to detect the root-mean-square level as a signal parameter of the plurality of signals. This detected signal parameter is directed to the control unit 2 for generation of respective control signals.

Figure 4A:
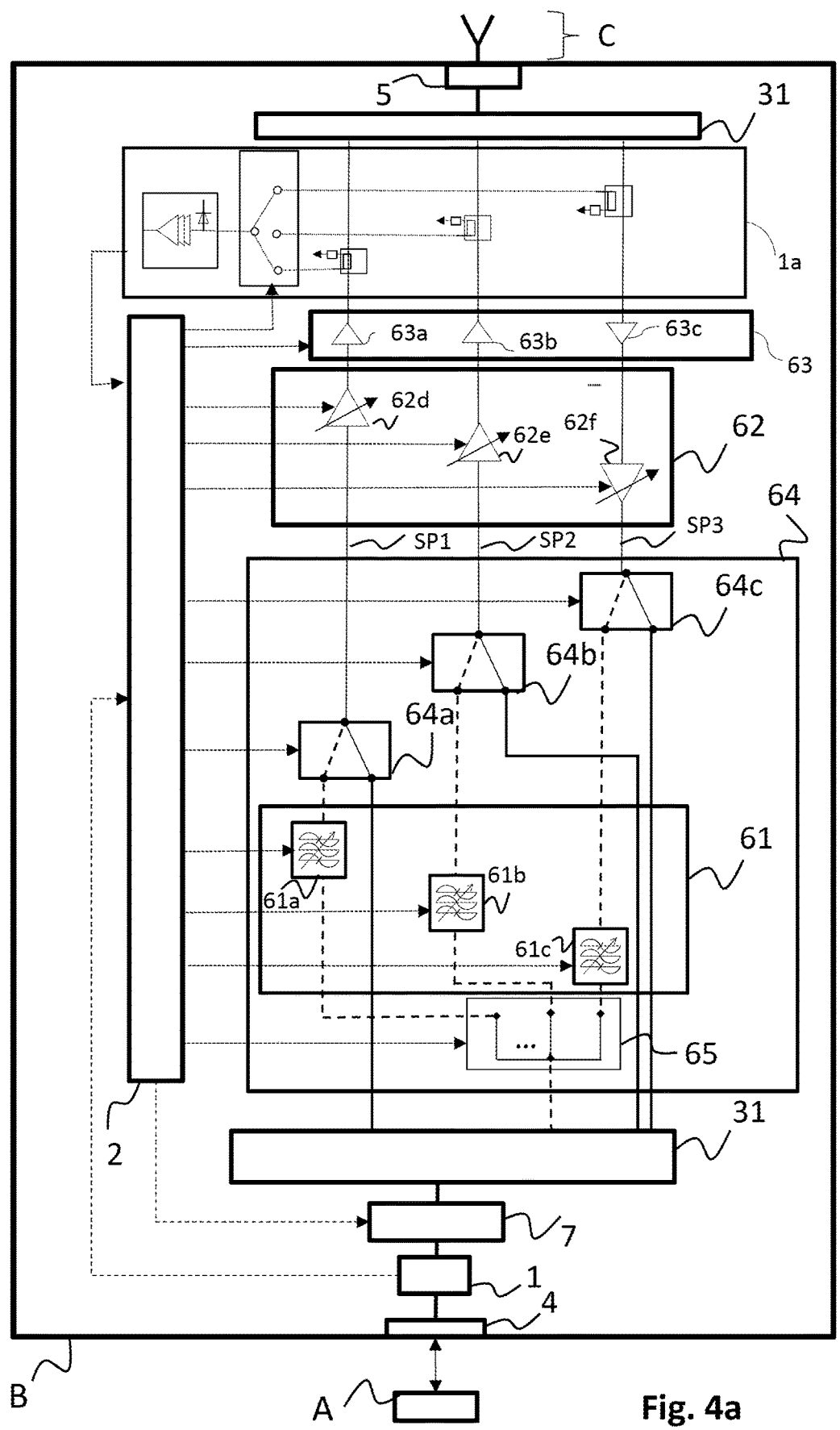
FIG. 4a illustrates a simplified block diagram of a circuit arrangement with carrier aggregation according to an exemplary embodiment.

In FIG. 4a, another exemplary embodiment of a circuit arrangement B with carrier aggregation in uplink mode is shown. The embodiment of FIG. 4a is based on the embodiment of FIG. 4 and the description related thereto may be valid for the embodiment of FIG. 4a. In contrast to FIG. 4, FIG. 4a may comprise variable gain amplifier units 62d, 62e, 62f instead of variable attenuation units 62g, 62h, 62 as shown in FIG. 4. These variable gain amplifier units 62d, 62e, 62f in the signal adjusting section 6 may be arranged in each respective signal path SP1, SP2, SP3. By means of these variable gain amplifier units 62d, 62e, 62f, a gain value as a characteristic value can be set and/or adjusted for each signal path SP1, SP2, SP3 for independently adjusting a power level or an amplitude level of the signals transmitted via the corresponding signal path SP1 to SP3. The variable gain amplifier units 62d, 62e, 62f may be located in frequency-specific portion of the uplink signal paths SP1, SP2, SP3. By adjusting a gain value as the characteristic value, desired gains can be set for adjusting an amplitude or power value as signal parameter of signals transmitted over these signal paths SP1, SP2, SP3.

In another exemplary embodiment of a circuit arrangement B with carrier aggregation (not shown in FIG. 4 and not shown in FIG. 4a) both, variable gain amplifier units 62d, 62e, 62f and variable attenuation units 62g, 62h, 62, may be arranged in the signal adjusting section 6 in each respective signal path SP1, SP2, SP3 in order to set and/or adjust a gain value independent from an attenuation value as characteristic values for each signal path SP1, SP2, SP3 for independently adjusting a power level or an amplitude level of the signals transmitted via the corresponding signal path SP1 to SP3.

Figure 5A:
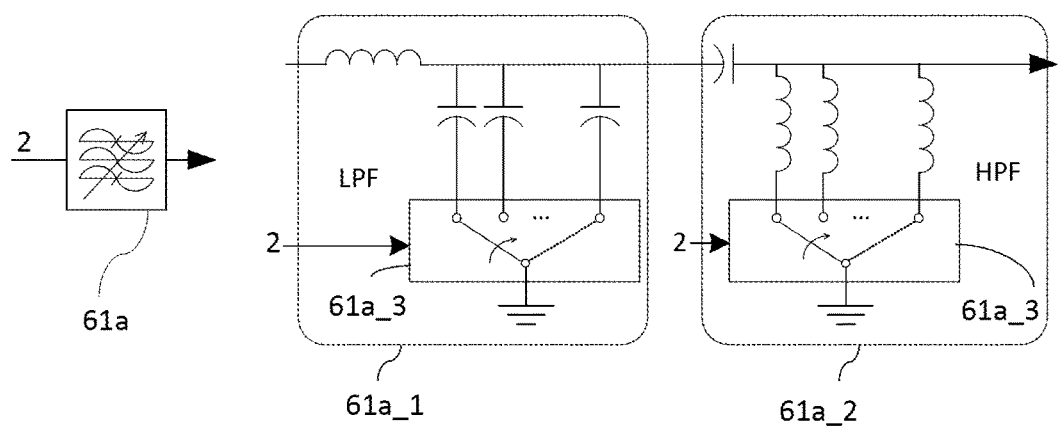
FIG. 5a illustrates a simplified block diagram of a tunable filter unit with adjustable frequency ranges according to an exemplary embodiment.

FIG. 5a shows an exemplary embodiment of a tunable filter unit 61a that may be used in the above described circuit arrangement(s) B of FIGS. 1 to 4a. The filter unit 61a may comprise a low pass filter section 61a_1 and a high pass filter section 61a_2. Each of these two sections 61a_1, 61a_2 may have a switching element 61a_3 that is connected to the control unit 2 to receive a control signal generated by the control unit 2. Each switching element 61a_3 may provide a plurality of switching states that are adjusted (set) by the control signal provided from the control unit 2. In FIG. 5a, all switching elements 61a_3 may obtain a control signal from the control unit 2 to adjust or set their switching state of the respective filter section as the characteristic value. In one implementation, all switching elements 61a_3 may obtain the same control signal from the control unit 2 and as a result may be switched to the same switching state. This means that in a first switching state, both, the low pass filter section 61a_1 and the high pass filter section 61a_2 may be switched to the first passive element of the respective low pass filter section 61a_1 and a high pass filter section 61a_2. This means that in a second switching state, both, the low pass filter section 61a_1 and the high pass filter section 61a_2 may be switched to the second passive element of the respective low pass filter section 61a_1 and the high pass filter section 61a_2. This means that in a last switching state, both, the low pass filter section 61a_1 and the high pass filter section 61a_2 may be switched to the last passive element of the respective low pass filter section 61a_1 and the high pass filter section 61a_2. In another implementation, each switching element 61a_3 obtains a different control signal from the control unit 2 and as a result is switched to an individual switching state. So, each of the low pass filter section 61a_1 and the high pass filter section 61a_2 may be independently adjusted, e.g. by separate control signals. The selection of respective values for the passive inductive or capacitive elements in the respective section lead to a specific transmission function of the filter unit 61a and as a result in a different frequency range. In each implementation, the control signal may be a digital switching signal to set the switching state.

Figure 5B:
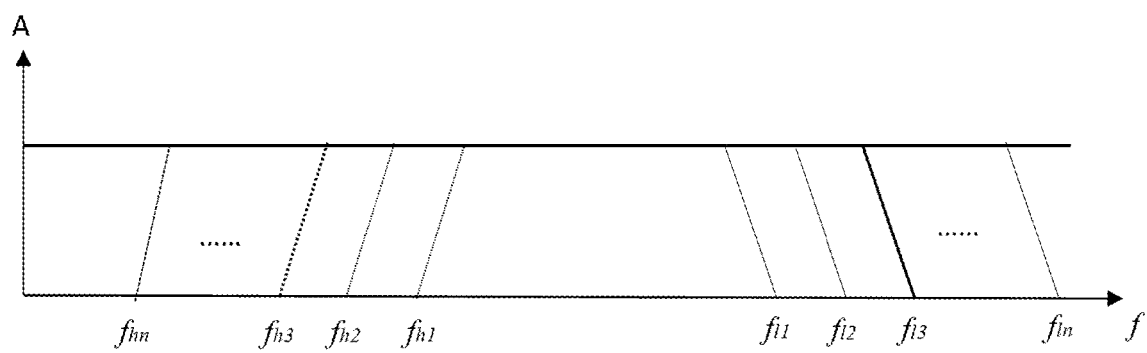

FIG. 5b shows respective transmission functions of the tunable filter unit 61a corresponding to the individual switching states of FIG. 5a that are adjusted by the control signal of the control unit 2.

According to FIGS. 4, 5a and 5b, an intra-band carrier aggregation may be proceeded on dedicated signal paths by splitting the respective uplink or downlink signals, the signal paths having tunable-filters 61a-c whose filter characteristics is dependent on the currently applied signal of the plurality of signals detected by the detector unit 1. The power level of the signals can also be adopted individually by means of the attenuation units 62g, 62h, 62i. In case of inter-band carrier aggregation, the tunable filters 61a-c may not be needed.

Furthermore, it may be useful to integrate broadband drivers and broadband power amplifiers in each of the uplink and/or downlink signal paths to flexibly fulfill all available carrier aggregation topologies.

The control signals generated by the control unit 2 according to FIGS. 1 to 7 may be digital signals. These control signals may either carry the setting or adjustment information directly, e.g. a concrete characteristic value to be set or to be adjusted in a component of the signal adjustment section 6. For instance, a 7-bit signal may be used to digitize the characteristic value to be set or to be adjusted in the component.

In another implementation, the control signals are 1-bit control commands that merely represent two digital states, namely a first state (e.g. HIGH) for increasing/decreasing a characteristic value and a second state for not changing the characteristic value. Alternatively, a digital code for "increase", "hold" and "decrease" may be provided to the respective component to respectively increase/hold/decrease the corresponding characteristic value.

In an implementation, the control signal does not carry any information regarding the characteristic value of the component to be adjusted. In this implementation, the control signal merely carries control commands based on the detected scenario.

For instance, a wireless coupler (an interface between a terminal A and an external antenna C, e.g. of a car, also referred hereinafter as terminal interface) may have a minimum attenuation of 3 dB and a maximum attenuation of 13 dB. Of course, other values are possible, and this disclosure is not limited to such concrete power values. An overall amplification may be dimensioned to compensate for a maximum of attenuation.

It may be a requirement that an overall amplification, e.g. the sum of an inventive circuit arrangement and a wireless coupling device may be at a specific relative power level, e.g. zero dB (amplification value of 1). The maximum gain value would be 13 dB. An equation that needs to be fulfilled is that output power should be equal to the sum of input power and the difference between the gain value of circuit arrangement B and that gain value of wireless coupler.

Another system requirement may be the minimum/maximum power levels. For GSM 900 standard, the minimum power level is 5 dBm and the maximum power level is 33 dBm. If the wireless coupler operates at 3 dB gain, the output power of a signal may be 15 dBm if its input power is 5 dBm. The terminal A cannot further reduce the power and so, it may be necessary to dynamically adapt an attenuation value of that signal in the circuit arrangement B to 10 dB attenuation to guarantee a power level of 5 dBm. This may be true in case the output power level of the terminal increases (e.g. movement towards the base station). To avoid an exceeding of the maximum power level, a flexible upper threshold is suggested to secure that the upper threshold value can be reached in all scenarios. For GSM 1800 standard, the minimum power level is 0 dBm and the maximum power level is 30 dBm and respective adaptions are necessary. An adjustment of upper threshold values and lower threshold values as disclosed in EP 2 992 604 A1 may be applied additionally, whose disclosure is incorporated by reference.

In any case, adjustments of individual signal parameters may be required to fulfil the system requirements for power value levels at one base station in order to ensure that the signal strength values for all signals (from different terminals) can be equal at one base station while (1) the terminal A is moving in the coverage area (e.g. when located inside a moving car) and (2) plural base stations may be used for a single data communication (e.g. dual connectivity).

Figure 6:
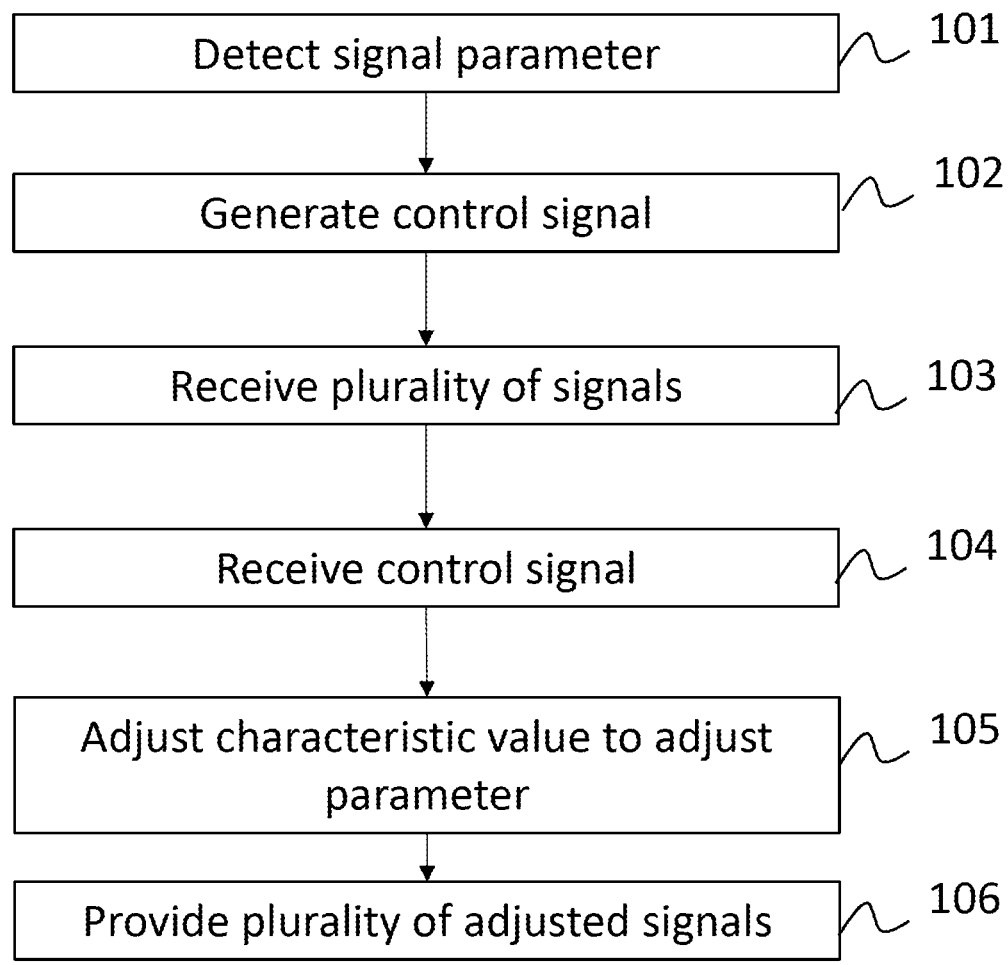
FIG. 6 illustrates a process flow of a method for adjusting signal parameters according to an exemplary embodiment.

FIG. 6 shows an exemplary embodiment of a process flow of a method 100 for adjusting signal parameters of a plurality of signals.

The plurality of signals may be transmitted between one or more terminals A and one or more antennas C with an intermediate circuit arrangement B as described in the above FIGS. 1 to 5. The method 100 comprises the following steps: In a detecting step 101, which may be performed by means of a detecting unit 1 of a circuit arrangement B, one or more signal parameters of a currently transmitted plurality of signals can be detected. In a step 102 that may directly follow step 101, one or more control signals is generated based on the detected one or more parameter by means of a control unit 2 of the circuit arrangement B. In step 103 that may directly follow step 102, the plurality of signals having the detected one or more signal parameters is received by means of a signal adjusting section 6 of the circuit arrangement B. In a further step 104 that may directly follow step 103, the one or more control signals from the one or more output ports of the control unit 2 may be received by means of the signal adjusting section 6 of the circuit arrangement B. The sequence of the above steps 102 and 103 may be interchanged.

In step 105 that may directly follow step 104, a characteristic value of one or more components may be adjusted for individually adjusting one or more signal parameters for two or more signals of the received plurality of signals based on the received one or more control signals to obtain a plurality of adjusted signals that may be adjusted by means of the signal adjusting section 6 of the circuit arrangement B. In step 106 that may directly follow step 105, the plurality of adjusted signals having the one or more adjusted signal parameters may be provided by means of the signal adjusting section 6 of the circuit arrangement B.

Figure 7:
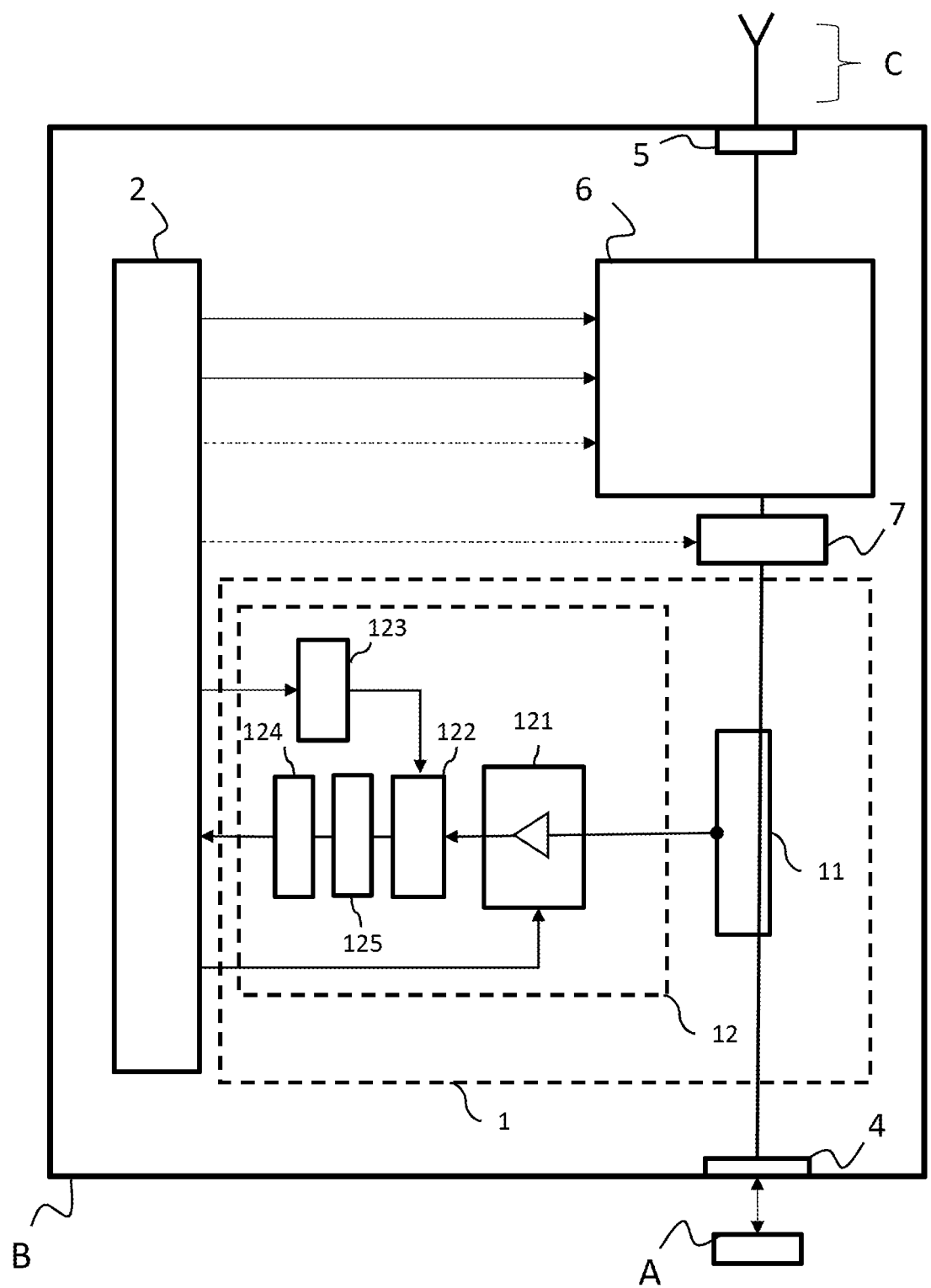
FIG. 7 illustrates a simplified block diagram of a circuit arrangement with detector details according to an exemplary embodiment.

FIG. 7 shows another exemplary embodiment of a circuit arrangement B. The circuit arrangement B may serve, as already described in FIGS. 1 to 4a, for the transmission of uplink and downlink signals between a terminal device A and an antenna C. To avoid unnecessary repetitions, the corresponding explanations in FIGS. 1 to 4a are also valid for this FIG. 7 unless otherwise stated. In FIG. 7 an implementation for the previously mentioned detecting unit 1 is described.

The detecting unit 1 of FIG. 7 may be able to detect several frequency bands (e.g. for inter-band carrier aggregation) as well as several channels in one frequency band (e.g. for intra-band carrier aggregation) and may be configured to measure the power values of these frequency bands and/or channels.

The detecting unit 1 may comprise a signal coupler 11 and a signal parameter detector 12. The signal parameter detector 12 may comprise an amplifier unit 121, a mixer unit 122, a variable frequency oscillator 123, a filter 125 and a power detector 124. The amplifier unit 121 and the variable frequency oscillator 123 may be controlled by the control unit 2. The power detector 124 may output the measured power value to the control unit 2.

Now, the operation of the detecting unit 1 for detecting uplink signals is described. These uplink signals may be provided to the signal coupler 11 from the terminal A via the terminal-side interface 4. A small uplink power signal portion may be decoupled from the signal coupler 11. This decoupled signal portion may be further processed in the signal parameter detector 12 and the control unit 2. The signal coupler 11 is preferably a directional coupler. Another type of a signal coupler 11, such as a Wilkinson divider, may alternatively be used. The decoupled signal portion may be fed to an amplifier unit 121. This amplifier unit 121 may amplify decoupled signals having a small amplitude and/or may attenuate decoupled signals having a high amplitude. The output signals of the amplifier unit 121 may be fed to a mixing unit 122. The mixing unit 122 is preferably an active mixer.

In the mixing unit 122, the (amplified or attenuated) output signals of the amplifier unit 121 may be mixed with an output signal of the variable frequency oscillator 123. This mixing results in a plurality of mixed products at the output of the mixing unit 122. From this plurality of mixed products, the first-order differential product may be filtered out by means of a filter unit 125.

The frequencies of the frequency oscillator 123 may be fixed frequencies. These frequencies may be generated within a predetermined raster, e.g. in steps of 100 KHz. The amplifier unit 121 may output modulated signals. The mixing process may generate a power frequency spectrum of a baseband signal as a first order differential product. Depending on the filter bandwidth of the filter unit 125, a portion of the power frequency spectrum may be filtered out by the filter unit 125. The remaining portion of the power frequency spectrum may be measured in the power detector unit 124 as a power value of the detected signal. The measured power value may be further processed in the control unit 2 as the signal parameter of the detected signal (as explained above).

Thus, there may be a fixed relation between the frequency of the frequency oscillator 123 and the measured power of the power detector unit 124 with a known bandwidth of the filter unit 125.

Figure 8:
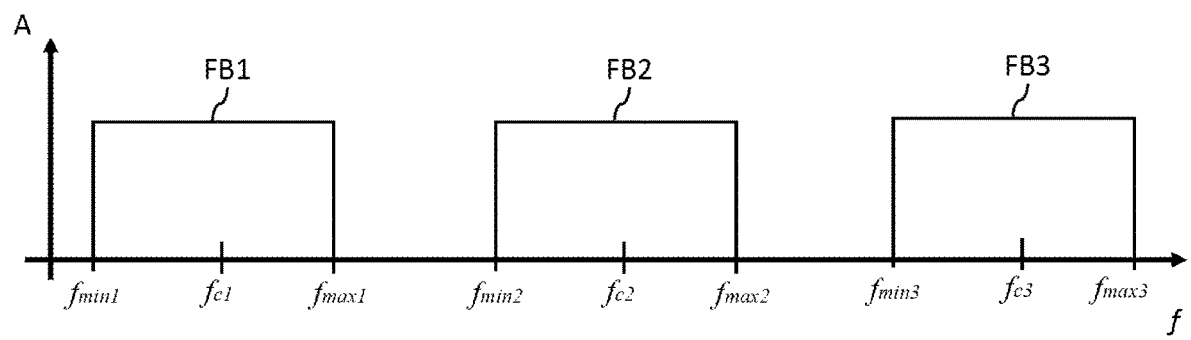
FIG. 8 illustrates a signal transmission scheme with three frequency bands according to an exemplary embodiment.
Figure 9:
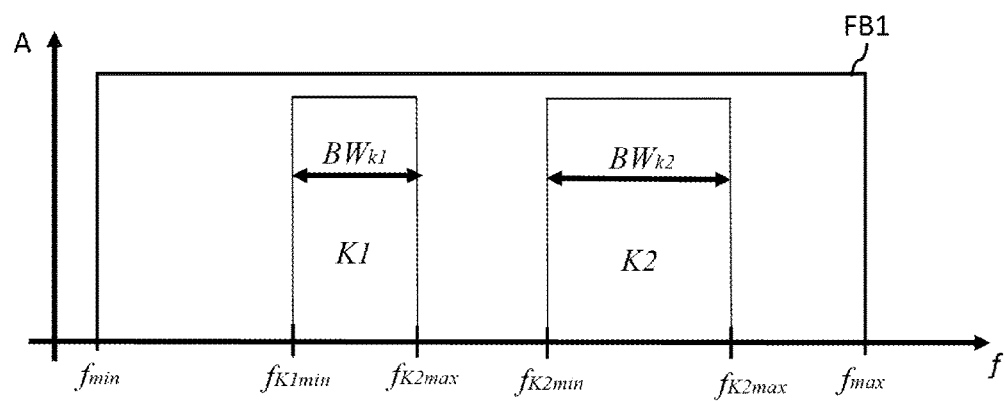
FIG. 9 illustrates a signal transmission scheme of one frequency band having two channels according to an exemplary embodiment.

FIGS. 8 and 9 show two possible cases of a signal detection. FIG. 8 shows the detection of signals in mobile radio frequency bands FB1, FB2, FB3. For this purpose, the variable frequency oscillator 123 may be successively adjusted to carrier frequencies fc1, fc2, fc3. The filter bandwidth of the filter unit 125 may be adjusted to a corresponding bandwidth of the mobile radio frequency band FB1, FB2, FB3. If a power value level is present at the power detector unit 124, the signal present in the corresponding mobile radio frequency band FB1, FB2, FB3 is considered to be detected. In this way it is possible to detect inter-band aggregated uplink signals.

It may also be possible, not shown in FIG. 8, to step the frequency oscillator 123 in a certain raster (e.g. 10 MHz) with the corresponding bandwidth of filter unit 125 through the mobile radio frequency range. If a power level is present at one or more of the frequency steps of the variable frequency oscillator 123 at the power detector unit 124, the corresponding signal present in the corresponding mobile radio frequency band FB1, FB2, FB3 may be considered to be detected.

FIG. 9 shows the detection of two mobile radio channels K1 and K2 within a mobile radio frequency band FB1. The signals of the mobile radio channels K1, K2 may be detected by stepping the variable frequency oscillator 123 in predetermined frequency steps, e.g. 100 KHz, through the entire mobile radio frequency range, whereby the filter bandwidth of the filter unit 125 is higher than the predetermined frequency steps, e.g. 200 KHz, and whereby at each frequency step it is detected whether a power value level is present at the power detector unit 124 or not. It is thus possible to determine the frequency position of the mobile radio frequency channels, see frequencies $f_{K1min}$, $f_{K1max}$; $f_{K2min}$, $f_{K2max}$ within the mobile radio band FB1 and their corresponding channel bandwidths $BW_{K1} = f_{K1max} - f_{K1min}$; $BW_{K2} = f_{K2max} - f_{K2min}$ as a function of the detected power value level.

As shown in FIG. 9, the channel bandwidth may differ between individual channels. For instance, the channel bandwidth $BW_{K1}$ may be smaller than the channel bandwidth $BW_{K2}$. As also shown in FIG. 9, the position of a channel in a frequency band FB1 may be asymmetric to the frequencies of the frequency band.

In FIG. 9, the frequency channels K1, K2 in the frequency band FB1 may be arranged with a frequency separation gap, e.g. the frequency range between $f_{K1max}$ and $f_{K2min}$ min in the same frequency band, which is called non-contiguous inter-band carrier aggregation. Not shown in FIG. 9 is an embodiment in which the frequency channels K1, K2 in the frequency band FB1 may be arranged directly adjacent to each other, e.g. that frequency $f_{K1max}$ is equal to $f_{K2min}$ in the same frequency band, which is called contiguous inter-band carrier aggregation.

All features of all embodiments described, shown, and/or claimed herein can be combined with each. Embodiments shown in a specific drawing may be used as intermediate steps for embodiments shown in another drawing.

The obtained plurality of signals may include the two or more single signals with the adjusted signal parameters, and these may be provided at a second port of the signal adjusting section. Signals of the received plurality of signals that are not adjusted by the circuit arrangement (remaining signals) may be handled in two different manners. In a first alternative, the remaining signals may be provided to the second port of the signal adjusting section without adjustments, e.g. by routing these signals without further adjustment or by bypassing the signal adjusting section. In this first alternative, the difference between the received plurality of signals and the obtained plurality of signals may be that one or two or more signals of the received plurality of signals have the adjusted signal parameters and all remaining signals of the plurality of signals are routed without further adjustment. The number of the obtained plurality of signals may be equal to the number of the received plurality of signals.

In a second alternative, the remaining signals may not be provided to the second port of the signal adjusting section, e.g. by highly attenuating these signals. In this second alternative, the difference between the received plurality of signals and the obtained plurality of signals may be that only the least two signals of the received plurality of signals with the adjusted signal parameters may be provided to the second port of the signal adjusting section. The number of the obtained plurality of signals is less than the number of the received plurality of signals.

The adjustment of the signal parameter(s) for the one or two or more single signals is made independently. This means that the adjustment of a first signal is made without influence on a further adjustment of a second (or third, etc.) signal. This independent adjustment excludes a common adjustment of the (all) plurality of signals at once, e.g. a change of characteristics of a common signal path that affects all signals at the same time, such as a change of an overall attenuation or gain value.

In other words: The independent adjustment of the signal parameters of one or two or more single signals relates to two distinct adjustments of these two or more signals. Additionally, a common adjustment of the signal parameter for all received plurality of signals may be processed at once, e.g. a common attenuation or a common amplification at once.

A signal parameter of a signal defines a signal property of that signal. The signal parameter may be one or more of a discrete frequency value and/or a frequency range value (e.g. a bandwidth value), an amplitude value and/or a power value (e.g. a signal strength) and/or timing value (burst signal or continuous signal) of one or more of the received signals.

A timing value as a signal parameter may be that the signal is a pulsed signal, e.g. if it is a time division duplex, TDD, signal. A timing value as a signal parameter may be that the signal is a continuous signal, e.g. if it is a frequency division duplex, FDD, signal. A timing value as a signal parameter may be an uplink or downlink time period or a change thereof.

The independent adjustment refers to one or more of these signal parameters. So, a first signal parameter (e.g. a first frequency value or a first amplitude value or a first power value) is adjusted for a first signal independent on an adjustment of a second parameter (e.g. a second frequency value or a second amplitude value or a second power value) for a second signal.

A component of the signal adjusting section is an element that is located at or located in a signal path of the signal adjusting section, namely between the antenna(s) and the terminal(s). The component has a characteristic value that can be adjusted based on one or more control signals. The characteristic value is for instance an adjustable parameter or preference of the component.

A characteristic value of a component of the signal adjusting section may define a property of that component. If the component is an amplification unit, the characteristic value may be an amplification value. If the component is a gain unit (also referred to as amplification unit), the characteristic value may be a gain value. If the component is an attenuation unit, the characteristic value may be an attenuation value. If the component is a filter unit, the characteristic value may be a frequency value, a frequency range value, an order of the filter unit and/or a slope rate. If the component is an activation unit, the characteristic value may be the activation state. If the component is a switching unit, the characteristic value may be the switching state.

The characteristic value may be one or more of a gain value and/or an attenuation value and/or a switching state (or a corresponding device/unit) and/or a frequency value and/or a frequency range value of that component. A gain value and/or an attenuation value of as a characteristic value may be derived by comparing an amplitude value or a power value as the detected signal parameter with a respective reference signal parameter that is either pre-stored in the circuit arrangement or that is calculated by the control unit.

Additionally, or alternatively, the detected signal parameter(s) may be or may include information about one or more discrete frequency (e.g. a center frequency, a lower cut-off frequency, an upper cut-off frequency), a frequency range (bandwidth value) and/or a frequency channel value of the currently received plurality of signals. The signal parameter may be an information that enables to identify, which frequency band(s) or channel(s) are used by the plurality of signals. In this regard, an inter-band carrier aggregation or an intra-band carrier aggregation or a dual connectivity can be detected. Respective detecting at the detecting unit may provide information required to generate the control signal(s).

Preferably, the detecting of the one or more frequency range may include the detecting of a first frequency range, wherein the first frequency range may include one or more frequency channels in a first mobile communication frequency band.

The detecting of the one or more frequency ranges may include the detecting of a second frequency range, wherein the second frequency range may include one or more frequency channels in the first mobile communication frequency band and/or in one or more second mobile communication frequency bands.

So, one or more signal parameters of the plurality of signals may be evaluated by the control unit. It may be possible that this one or more signal parameters is determined by the control unit itself or that it is provided by means of the detecting unit. The one or more signal parameters can for instance be one or more signal power value. A signal power value can be represented in particular by a signal level value. It is possible that the signal parameter (signal property) has to be determined for a predetermined period of time before it may become a valid signal parameter.

For example, it is possible that the signal property may be compared with predetermined threshold values. Other forms of evaluation may be possible.

In a preferred embodiment, the one or more control signals may be provided by the control unit to one or more output ports of the control unit. The one or more output ports may be an input port for another signal, e.g. a detector signal provided to the control unit, in a time duration, in which the one or more control signals may not be provided to the signal adjustment section.

In a preferred embodiment, the one or more control signals may be received by the signal adjusting section from the one or more output ports of the control unit.

In a preferred embodiment, the one or more control signals may be received by the signal adjusting section at one or more control input ports of the signal adjusting section.

The detection of a signal parameter may be the result of an individual detecting unit and may result in different control signals to be generated by the control unit. Different detecting units may be used that may cause the generation of different control signals. E.g. one detecting unit may be used to detect whether or not a power level exceeds a maximum threshold value. If a power level is exceeded, the detecting unit may cause to generate a control signal to limit a power level value or to adjust a gain value in order to protect the circuit arrangement and to avoid any damage. Alternatively or additionally, detecting units may be used to detect input power characteristics at a terminal-interface of the circuit arrangement and/or to detect output power characteristics at an antenna-interface to ensure that the signal parameters meet the requirements for protecting the circuit arrangement and for protecting a respective receiving unit, e.g. a base station or a terminal, to which the plurality of signals should be directed.

Upon detecting the one or more signal parameters of the plurality of signals, the independent adjustment of the one or more signal parameters for the two or more signals may be processed for each single signal subsequently, preferably directly subsequently. This means that the respective two signals may be adjusted at (slightly) different time points in order to influence the signal transmission characteristics of the two or more signals in a signal transmission (=data transmission) of the received plurality of signals via the circuit arrangement. This subsequent processing may be caused by using a single-thread processor as the control unit. Such a control unit may generate only one control signal per time unit. However, such a subsequent processing may still be realized as quasi-parallel processing, e.g. if high clock rates are applied. The processing of the independent adjustment may be caused by using a microcontroller as a control unit. Such a control unit may generate a distinct control signal in one time unit. So, the control unit a first control signal in a first time unit and a second control signal in a second time unit. A subsequent processing of the generated signal can still be regarded as quasi-parallel processing, e.g. if high clock rates are applied or several control lines are set simultaneously.

Upon detecting the one or more signal parameters of the plurality of signals, the independent adjustment of the one or more signal parameters may be made for each single signal in a timely parallel manner, preferably quasi-simultaneously. This means that the respective two signals may be adjusted at a same time of an adjustment scenario in order to influence the signal transmission characteristics of the one or two or more signals of a signal transmission of the received plurality of signals via the circuit arrangement. This quasi-parallel processing may be caused by using a multi-thread processor as the control unit. Such a control unit may generate more than one control signal per time unit.

Prior to the adjustment, a detection may be processed in which signal parameters of all signals are collected and as a subsequent step, the adjustment is made. Alternatively, also the detection may be made in timely parallel manner for each signal path and the adjustment may be made on the basis of each signal path upon detecting the signal parameter.

Upon detecting a signal parameter of a first signal of the plurality of signals, the adjusting of the characteristic value of a first component may be processed, wherein the adjusting of the characteristic value of a second component may be processed upon detecting a signal parameter of a second signal of the plurality of signals. So, a signal path may be adjusted upon detection of the second signal.

Upon detecting a signal parameter of a first signal of the plurality of signals, the adjusting of the characteristic value of a first component arranged in a first signal path of the plurality of individual signal paths and the adjusting of the characteristic value of one or more second component arranged in a second signal path of the plurality of individual signal paths may be processed. So, two or more signal paths are immediately adjusted as soon as a signal parameter of a first signal may be detected.

The circuit arrangement as proposed herein may be capable of transmitting uplink and downlink signals between one or more terminals and one or more antennas. Such a circuit arrangement may compensate for losses in the transmission of these uplink and downlink signals, for example insertion losses caused by components, e.g. an attenuation caused by a conducting cable or caused by a coupling factor of a universal high frequency coupler at the terminal-side interface or the antenna-side interface, and enables in a multi-signal path environment to separately regulate two or more individual signals out of the plurality of signals.

The adjusting scheme as applied by the circuit arrangement may occur during the actual transmission of the plurality of signals. Thus, the plurality of signals may be adjusted during operating the circuit arrangement, e.g. when transmitting the signal between the antenna(s) and the terminal(s). So, the signal transmission between the antenna(s) and the terminal(s) may be observed and may be corrected (adjusted) by the circuit arrangement accordingly.

The circuit arrangement may be a compensation unit (compensator) of a plurality of uplink and downlink radio signals. Such a compensating unit may be used to compensate any attenuation that occurs by signal transmission between the terminal(s) and antenna(s). The attenuation may be caused by conducting cables and/or other coupling losses, e.g. when the antenna(s) may be arranged external to the terminal(s), for instance in a vehicle.

The plurality of signals may be uplink and downlink radio signals of a mobile communication radio standard, having uplink and/or downlink frequency bands according to one radio standard or different radio standards, for example, a GSM standard, a UMTS standard, an LTE standard, a WIFI, and/or 5G new radio standard.

A use-case for such a circuit arrangement may be its operation as a mobile radio compensating unit (compensator) for use in a motor vehicle, which may serve to compensate for a signal attenuation in the signal transmission of a plurality of uplink and downlink radio signals from or to a mobile device, as well as a motor vehicle. Since a vehicle acts as a Faraday cage in terms of signal transmission, a quality of service for mobile communications originated from or ceased in a terminal located inside the vehicle may be reduced. Using the circuit arrangement as disclosed herein, a compensation for loss(es), an increase of a radio cell radius, an increase of a data throughput at the edges of a radio cell and/or an increase of the quality of service may be achieved.

A terminal may be a mobile device, e.g. a terminal that can be carried by a user. Such a mobile device may be a mobile phone or a tablet PC, or a laptop. Additionally, a terminal may be a modem or a control device. The terminal may be a permanently installed in another bigger entity, e.g. a vehicle or a production site or a machine. The terminal may be a telematic device in a vehicle.

In modem communication schemes, a plurality of signals is used for signal transmission between two communication nodes. A plurality of signals may be referred to as a plurality of frequency carriers each carrier being capable of carrying information, such as voice or data, in order to exchange these information between the terminal(s) and the antenna(s) via the circuit arrangement in a time-efficient manner without significant losses. The signals have frequency range values as signal parameters. These signals are preferably radio signals having carrier frequencies that are situated in one predefined frequency band (intra-band communication) of the frequency range or having carrier frequencies that are situated in more than one predefined frequency band (inter-band communication) of the frequency range.

In other words: A frequency range may comprise a plurality of frequency bands for transmitting the plurality of signals. A frequency band may comprise a plurality of channels.

Hereinafter, the term frequency channel may in particular be referred to one carrier of information. Each channel may be located in a frequency range (sub-band) of the frequency band, which may comprise only a part of the frequencies of the frequency band.

In LTE or New Radio systems, such a frequency channel may be called "component carrier". An LTE component carrier may have a specified bandwidth of 1.4 MHz, 3 MHz, 5 MHz, 10 MHz, 15 MHz, or 20 MHz. For New Radio systems further bandwidths may be specified.

Carrier aggregation may be defined by using two or more frequency channels for data transmission.

Several signals of the plurality of signals may be transmitted simultaneously over different frequency channels of one frequency band, which can be called intra-band carrier aggregation. Several signals of the plurality of signals may be transmitted in timely alternating manner over different frequency channels of one frequency band, which can also be called intra-band carrier aggregation.

Several signals of the plurality of signals may be transmitted simultaneously over different frequency channels of different frequency bands (originated from the same base station), which can also be called inter-band carrier aggregation. Several signals of the plurality of signals may be transmitted in timely alternating manner over different frequency channels of different frequency bands, which can also be called inter-band carrier aggregation Several signals of the plurality of signals may be transmitted in a plurality of different frequency bands by means of different base stations, which is called dual connectivity. 5G networks that support all manner of spectrum aggregation may tightly be linked to LTE networks and may use a dual connectivity technology in a so called non-standalone 5G network. In such a scenario, non-standalone 5G networks rely on an LTE core and enable radio access network with the addition of a 5G carrier. In dual connectivity, a signal of the plurality of signals may be transmitted via an LTE base station (eNodeB) and timely parallel another signal of the plurality of signals may be transmitted via a 5G base station (gNodeB). Dual connectivity should not be confused with dynamic spectrum sharing, DSS, which allows operators to provide LTE and 5G in the frequency band at the same time.

A frequency band or a channel may be assigned exactly one carrier frequency, for example a center frequency of the frequency band/channel. A frequency band or a channel may be assigned one carrier frequency and several subcarrier frequencies. Thus, in terms of LTE, one frequency band may be divided into a plurality of component carriers. Each component carrier may be assigned one carrier frequency.

A universal detecting unit may be used to identify the signal parameter. The detecting unit is configured to detect one or more signal parameters of the plurality of uplink and/or downlink signals. A detecting unit as described in DE 10 2014 213 933 A1 or DE 10 2017 219 690 A1 may be used.

In an embodiment, a detector unit may be used that functions with frequency synthesis and frequency mixing principles. Hereby different frequency bands or frequency channels may be identified to which one or more adjustable frequencies of a frequency oscillator are (is) assigned, which are (is) generated by a circuit arrangement to identify the currently used frequency bands. If for an adjustable frequency of the frequency oscillator it is determined that the signal parameter (signal property) fulfills a certain criterion, e.g. a signal power value of the signal is greater than a given threshold power value, the frequency band being assigned to this adjustable frequency may be identified as a frequency band or the channel assigned to this adjustable frequency can be identified as a frequency channel.

Subsequent to such an identification of a specific frequency band or frequency channel, in which a signal may be transmitted, a new identification of another frequency band or another frequency channel, in which another signal is transmitted, may be started. This may be an advantageous way to identify different frequency bands and/or frequency channels used in an inter-band carrier aggregation as well as intra-band carrier aggregation. So, an available frequency range may be scanned to identify used or unused frequency bands or frequency channels.

A frequency range may be a value that defines a range of a frequency scales, i.e. ranges of the electromagnetic spectrum of electromagnetic waves used for technical communication and has a certain bandwidth. The frequency range may be defined by a distinct frequency value (e.g. lowest frequency value within this range) and a bandwidth value. The frequency range may be defined as a range of (all) frequency values within a lowest frequency value and an upper frequency value. A frequency band refers to frequency subranges.

A frequency range may exemplarily be one of a single frequency channel in a mobile communication frequency band; a plurality of frequency channels in a mobile communication frequency band; a sum of frequency channels in a mobile communication frequency band; a single mobile communication frequency band; a plurality of mobile communication frequency bands; or a plurality of frequency channels in a plurality of mobile communication frequency bands.

The detecting of a frequency range value may include the detecting of two or more frequency channels in one or more mobile communication frequency bands. In case, the two or more frequency channels are detected as being in one frequency band, an intra band carrier aggregation may be detected. In case, the two or more frequency channels are detected as being in two or more frequency bands, an inter band carrier aggregation or dual connectivity mode may be detected.

In a preferred embodiment, several uplink signals can be transmitted by the circuit arrangement. So, the plurality of signals may be a plurality of uplink radio signals, wherein the first port of the signal adjusting section is an input port for receiving the plurality of uplink signals generated by the one or more terminals and wherein the second port of the signal adjusting section is an output port for providing the plurality of uplink signals with adjusted signal parameters to the one or more antennas.

Uplink signals may be transmitted in same or in different frequency channels. Frequency channels with carrier frequencies from a same frequency band or from mutually uplink frequency bands can be used between the terminal and the antenna. If frequency channels with carrier frequencies that are located in one uplink frequency band are used, an intra-band uplink carrier aggregation may be applied. These frequency channels in one frequency band may be arranged close to each other. In this case, the respective channel bandwidths of directly subsequent frequency channels are directly adjacent without frequency gap, which is also called contiguous intra-band uplink carrier aggregation. Or these frequency channels in one frequency band may be arranged with a frequency separation in the same frequency band, which is called non-contiguous intra-band uplink carrier aggregation. If frequency channels for uplink signals with carrier frequencies that are located in different frequency bands are used, an inter-band uplink carrier aggregation or dual connectivity mode may be applied.

An uplink path may be a signal path that is capable of transmitting an uplink signal from the terminal(s) to the antenna(s) via the circuit arrangement. In particular, the uplink signal may be a signal generated by the terminal(s) and transmitted to a terminal-interface of the circuit arrangement.

Several downlink signals can be transmitted by the circuit arrangement. So, the plurality of signals may be a plurality of downlink signals, wherein the second port of the signal adjusting section is an input port for receiving the plurality of downlink radio signals via the one or more antennas and wherein the first port of the signal adjusting section is an output port for providing the plurality of downlink signals with adjusted signal parameters to the one or more terminals.

Downlink signals may be transmitted in same or in different frequency channels. Frequency channels with carrier frequencies from a same frequency band or from mutually different downlink frequency bands can be used between the terminal and the antenna. If frequency channels with carrier frequencies that are located in one downlink frequency band are used, an intra-band downlink carrier aggregation may be applied. These frequency channels in one frequency band may be arranged close to each other. In this case, the respective channel bandwidths of directly subsequent frequency channels (e.g. component carriers) are directly adjacent without frequency gap, which is also called contiguous intra-band downlink carrier aggregation. Or these frequency channels (e.g. component carriers) in one frequency band may be arranged with a frequency separation in the same frequency band, which is called non-contiguous intra-band downlink carrier aggregation. If frequency channels for downlink signals with carrier frequencies that are located in different frequency bands are used, an inter-band downlink carrier aggregation or dual connectivity mode may be applied.

A downlink path may be a signal path capable of transmitting a downlink signal from the antenna (s) to the terminal(s) via the circuit arrangement. In particular, the downlink signal may be a signal received from the antenna(s), e.g. a signal provided from the base station.

Different uplink and/or downlink frequency bands may be used to transmit uplink and/or downlink signals according to one radio standard or different radio standards between the terminal(s) and the antenna(s). Such standards can be, for example, a GSM standard, a UMTS standard, an LTE standard, a WIFI, or 5G standard. So, an uplink and/or downlink frequency band can be assigned to exactly one, but also to several standards. This makes it possible to transmit uplink signals and/or downlink signals according to different standards in the same uplink and/or downlink frequency band, respectively.

Further signal processing means may be arranged in an uplink path and/or a downlink path to increase the signal transmission quality. Such a signal transmission may be routed via one or more of the above described signal paths by active and/or passive signal processing means. The signal transmission may take place via the signal adjusting section of the circuit arrangement that may comprise signal adjusting units for each downlink and/or uplink signal path. Each signal adjusting unit may further comprise one or more amplifier units, an attenuation unit, a filter unit and/or a signal switching element.

The signal adjusting section of the circuit arrangement may comprise a signal separation unit configured to separate a common signal path on which the plurality of signals is provided into a plurality of individual signal paths. Each signal path may be configured to carry one single signal of the plurality of signals.

Thus, the circuit arrangement may comprise means, in particular the signal separation unit, for providing terminal-originated uplink signals that are applied to the terminal interface via the circuit arrangement. These means may be or may comprise filter means, power dividers, circulators, switching devices, de-/multiplexers, and so on. These means may be arranged and/or formed in such a way that a signal with frequencies of an uplink frequency range or several uplink frequency ranges out of the plurality of signals provided by the terminal is filtered and/or (de)multiplexed. An uplink signal provided in this way may be transmitted via a corresponding uplink signal path. A means for providing an uplink signal or a part thereof may include a means of combining signals, preferably may be formed with frequencies from different frequency ranges, more preferably may be formed from different uplink signals. For instance, the plurality of signals is divided into a first uplink signal and in a second uplink signal that are at least partly routed via different uplink paths in the circuit arrangements.

Accordingly, the circuit arrangement may comprise means, in particular the signal path separation unit, for providing terminal-dedicated downlink signals received by the antenna(s) applied to the circuit arrangement by the antenna interface. The means may be arranged and/or formed in such a way that a signal with frequencies of a downlink frequency range or several downlink frequency ranges out of the plurality of signals provided by the antenna(s) is filtered and/or divided. A downlink signal filtered and/or divided in this way may be transmitted via a corresponding downlink path. A means for providing a downlink signal or part thereof may include a means of combining signals, preferably may be formed with frequencies from different frequency ranges, more preferably with different downlink signals. For instance, the plurality of signals is divided into a first downlink signal and in a second downlink signal that are at least partly routed via different downlink paths in the circuit arrangements.

Furthermore, the circuit arrangement may also include means for combining signals, in particular signals which are transmitted over different, preferably frequency range-specific, frequency ranges, uplink paths or path sections, or which are transmitted over different, preferably frequency range-specific, downlink paths or path sections.

The signal path separation unit may include one or more of the following: a multiplexer unit, a demultiplexer, a filter-bank, a switching unit, a splitting unit (e.g. a frequency splitting unit or a power splitting unit), a circulator unit, and/or a switch having multi-split function.

So, to share a common signal path, uplink and downlink signals can be transmitted in a time duplex process, which can also be referred to as TDD process (Time Division Duplex Process) or in a frequency duplex process, which can also be referred to as FDD process (Frequency Division Duplex Process).

The signal path separation unit may comprise a filter-bank. This filter-bank may be formed in such a way that a plurality of (input) signals of the filter bank are filtered such that signal(s) of exactly one uplink frequency range or exactly one downlink frequency range are provided or filtered as one or more signals of the plurality of output signals of the filter-bank. Such a filter-bank serves to provide single signal (frequency) bands, which are subsequently transmitted via a frequency range-specific signal path or section. Thus, such a signal path or section may include such a filter-bank.

A filter-bank may be formed by a frequency multiplexer. This frequency multiplexer may serve as a frequency-selective division of a plurality of (input) signals into (exactly) two or more than two output signals of the frequency multiplexer. In particular, a frequency multiplexer splits a plurality of (input) signals containing/comprising signals of different frequencies into two or more output signals, which each comprise different subranges of the frequency range of the plurality of (input) signals. Vice versa, the frequency multiplexer can also be used to combine exactly two or more than two input signals of different frequency ranges to exactly one output signal. For example, such a frequency multiplexer may be a so-called diplexers, triplexers, quadplexers, hexaplexers and so on.

Alternatively, or additionally, the signal path separation section for providing the single uplink/downlink signals may comprise one or more splitter, e.g. a power splitter. By means of the splitter, a plurality of signals can be split into two or more individual (output) signals. Each of the (output) signals can cover the same frequency range as the input signal. Furthermore, the splitter can be used to combine exactly two or more individual signals into exactly one (output) signal. In an embodiment, one or more splitters can be arranged in an uplink path or downlink path.

A filter bank and/or a splitter may be arranged in several downlink signal paths or uplink signal paths, preferably in a common path section thereof. This enables a reliable provision of desired uplink or downlink signals. Signal attenuation is reduced, and the installation space requirement and manufacturing costs are reduced compared to solutions with discrete components.

The circuit arrangement may comprise one or more first uplink signal paths for the transmission of a first uplink signal. Preferably, the circuit arrangement also comprises one or more further uplink paths for transmitting a further uplink signal.

The circuit arrangement may comprise a first downlink path for transmitting a first downlink signal. The circuit arrangement may include one or more further other downlink paths for transmitting another downlink signal.

A signal path may be a signal path that is not specific to a frequency range. A signal path that is not specific to a frequency range can be arranged and/or formed in such a way that signals from all downlink or uplink frequency ranges can be transmitted via this signal path.

A signal path can be a frequency range-specific signal path or may comprise a frequency range-specific signal path section. A frequency range-specific signal path or section can be arranged and/or formed in such a way that only signals from exactly one or from several, but not all, downlink or uplink frequency range(s) can be transmitted via this signal path.

A signal path may comprise several signal path sections which are different from each other and which may be specific with regard to the frequency range. In particular, a signal path may comprise a first section which serves to transmit a signal of one downlink or uplink frequency range, and a further (second) section which serves to transmit a signal from several downlink or uplink frequency ranges.

A plurality of signal paths may be present, which may be arranged and/or formed in such a way that only signals from a first downlink or uplink frequency range can be transmitted via a first signal path and only signals from a further downlink or uplink frequency range can be transmitted via the one or more further (second) signal paths, wherein the first and the further frequency range may be different frequency ranges. Thus, signals of different standards can be transmitted via different signal paths.

A signal path section may have a common signal path section of mutually different signal paths. Such a signal path section may be used for the transmission of a signal from several or even all uplink and downlink frequency ranges.

Thus, an uplink signal path or a downlink signal path may comprise several signal path sections. In the following description, a signal path may also be referred to a section of a signal path.

The circuit arrangement may include a terminal-side interface. This may be an interface for establishing a signal connection between the circuit arrangement and the terminal. This interface can enable a bidirectional transmission of signals. For example, this terminal-side interface includes a wireless coupler, to enable wireless communication with the terminal.

The circuit arrangement may comprise one or more antenna-side interfaces. This may be an interface(s) for establishing a signal connection between the circuit arrangement and the one or more antennas. The antenna(s) may be an external antenna(s). However, in an implementation form of the circuit arrangement, the antenna(s) is/are part of the circuit arrangement. The antenna(s) may be used to transmit/receive signals to/from a base station or other equipment. The antenna-side interface may enable a bidirectional transmission of signals.

The circuit arrangement may be located in a vehicle, e.g. a car or a truck. In this case, the external antenna may be a vehicle antenna.

The circuit arrangement may be a part of a mobile radio amplification device or may comprise or may form a mobile radio amplification device.

The generation of the control signal(s) may be based on the detected signal parameter(s). This includes the generation of control signal(s) by deriving control information, such as control commands, based on the detected signal parameters. The generation additionally or alternatively includes a comparing of one or more detected signal parameter(s) with one or more reference values, such as a threshold value.

The control unit of the circuit arrangement may be one of a plurality of control and evaluation units. The control unit may be a computing unit, capable of calculating or comparing detected signal parameters and evaluate necessary adjustment values. The control unit is preferably a microcontroller or an integrated circuit.

The detecting unit as described herein for detecting one or more signal parameters and the control unit for providing the one or more control signal(s) may at least partly be integrated into one control unit.

The control signal(s) may be generated based on the detected parameter(s), which includes that signal may be provided to the control unit for informing the control unit that a certain signal parameter exceeds/undershoots a certain threshold value.

The control signal may comprise adjustment commands to adjust the characteristic value of the component to a desired values, e.g. that the characteristic value to be adjusted will have a concrete (numeric) value that may lead to an adjustment of the signal parameter to a desired value.

Additionally, or alternatively, the control signal may comprise a much simpler command, such as an "increase" or "decrease" command that will lead to a respective incrementing/decrementing of the desired characteristic value to be adjusted.

The one or more generated control signals may be interpretable by the signal adjusting section or a respective device/unit thereof.

The adjusting of the signal parameter may be made by incrementing or decrementing a characteristic value of the component in the signal adjustment section.

The adjusting of the signal parameter may be made by changing (adjusting) a configuration as the characteristic value of the component in the signal adjusting section.

The one or more control signal(s) may be provided at control port(s) of the control unit. There may be a one-to-one relationship in which each control signal is provided to one control port. Each of the control signals may be inputted to one (distinct) component in the signal adjusting section. Alternatively, one control signal may be inputted to a plurality of components in the signal adjusting section.

One control signal may be used for adjusting one or more characteristic values of one or more components in the signal adjusting section for adjusting a signal parameters of one or two or more signals of the plurality of signals.

The one or more characteristic values of one or more components in the signal adjusting section for adjusting a signal parameter(s) of the one or two or more signals may be adjusted independently. So, the control signal may comprise information to individually adjust two signals of the plurality of signals. In a preferred embodiment, each signal parameter of the two signals may be adjusted on the basis of one distinct control signal generated by the control unit.

In a preferred embodiment, a signal coupler of the detecting unit may be configured to decouple a portion of the received plurality of signals to a signal parameter detector of the detecting unit to detect the one or more signal parameters of the plurality of signals. A detecting unit as described in DE 10 2014 213 933 A1 or DE 10 2017 219 690 A1 may be used.

The decoupling may occur from a signal path arranged between a terminal interface of the circuit arrangement and the first port of the signal adjusting section.

The decoupling may occur from a signal path arranged between an antenna interface of the circuit arrangement and the second port of the signal adjusting section.

There may be two or more signal couplers arranged in the circuit arrangement. In an embodiment, there may be two signal couplers adjacent to each other in between a terminal interface of the circuit arrangement and the first port of the signal adjusting section. These different signal couplers may be used to cause the generation of different control signals as explained above.

There may be two or more signal couplers arranged in the circuit arrangement. In an embodiment, there may be two signal couplers adjacent to each other in between an antenna interface of the circuit arrangement and the second port of the signal adjusting section to decouple different signal portions in parallel in an uplink mode.

The detecting unit may comprise a root-mean-square detector to derive a root mean square of the plurality of signals or to derive a root mean square of each signal of the plurality of signals.

The detecting unit may for instance be capable of detecting one or more uplink signals or one or more downlink signals. The detecting unit may be arranged and/or formed as described, for example, in DE 10 2014 213 933 A1 or in DE 10 2017 219 690 A1. The means for detecting uplink and/or downlink signals may also identify the presence of frequency range(s) of the corresponding uplink/downlink signal and/or a transmission standard of the detected uplink/downlink signal. A further signal analysis of the uplink/downlink signal may be performed to identify a standard, for example an analysis of a time course of the uplink/downlink signal. It may be determined whether an uplink/downlink signal is detected according to a TDD method or an FDD method.

The signal coupler can be arranged and/or designed in such a way that a signal applied to the circuit arrangement is decoupled. The design of a suitable signal coupler may be known and will therefore not be discussed in greater details. In particular, the signal coupler can provide a decoupled signal with lower power than the transmitted signal(s), whereby the decoupled signal otherwise has the same signal properties as the transmitted signal(s).

The circuit arrangement may comprise one or more signal couplers for providing a decoupled uplink or downlink signal. The signal coupler(s) can, for example, decouple an uplink signal transmitted via an uplink path from this uplink path. Accordingly, the signal coupler can also decouple a downlink signal transmitted via a downlink path from this downlink path. Alternatively, one signal coupler may be bidirectional to decouple signals irrespective of the transmission direction (uplink or downlink) through the detection unit to the control unit.

Additional signal processing means may be arranged in an uplink path and/or downlink path of the plurality of signals. The transmission of each signal may be performed via one of these signal paths by active and/or passive signal processing means. For example, the signal transmission can take place via one or more amplifier units and/or one or more attenuator units and/or one or more signal filter units and/or one or more signal switching units.

A port may serve as an interface between different units to enable connection of signal paths in order to transfer signals between these units. A port may not necessarily be restricted to one connection point, one port may for instance comprise a plurality of connection points, e.g. when the signal transmission comprises more than one signal path.

The signal adjusting section may comprise a filter section. The filter section may have one or more tunable filter units as the component (s), preferably a plurality of tunable filter units as the components. Each filter unit may be capable of adjusting a frequency range value as the characteristic value.

Herein, each filter unit may be a component of the signal processing in the circuit arrangement and may be used for removing some unwanted frequencies or unwanted frequency ranges from one or more signals of the plurality of signals as the characteristic value by the control signal. The filter unit may comprise a plurality of different filter types that may be combined. The combination of different filter types may be adjusted as a characteristic value by the control signal. One type of filter may be a low-pass filter, which allows low frequencies to pass, whereas high frequencies are attenuated. Another type of filter may be a high-pass filter, which allows high frequencies to pass, whereas low frequencies are attenuated. Another type of filter may be a band-pass filter, which allows only frequencies in a specific frequency band to pass. Another type of filter may be a band-stop filter or band-reject filter, which attenuates frequencies in a frequency band. Another type of filter may be a notch filter that rejects just one specific frequency and may be considered as an extreme band-stop filter. Another type of filter may be a comb filter which has multiple regularly spaced (equidistant) narrow passbands.

Each tunable filter unit may be capable of receiving a distinct control signal of the one or more control signals from the control unit to adjust a value of the frequency range value.

The one or more components may be arranged in one or more signal path of the plurality of individual signal paths. The component(s) may be adjusted by adjusting one or more of the following characteristic values of the frequency range value: a minimum cutoff frequency of the frequency of one of the tunable filter units and/or a maximum cutoff frequency of one of the tunable filter units and/or a bandwidth value of one of the tunable filter units; and/or an order of one of the tunable filter units. So, the frequency range value may be adjusted to reduce interferences, such as cross-talk, or reduce available channels in a frequency band of a frequency range.

A cut-off frequency of the filter unit may in particular be selected such that portions of a signal are reduced whose frequency is higher or lower than a predetermined level. The cut-off frequency of the filter unit can be selected in such a way that a component is attenuated, in particular with a desired attenuation. In other words, frequency portions can be filtered out of the signal. Furthermore, the cut-off frequency may be selected in such a way that differential signal portions are attenuated with frequencies which are greater or lower than a predetermined dimension, in particular with a desired attenuation.

Each tunable filter unit may be capable of receiving a distinct control signal of the one or more control signals from the control unit to adjust an order and/or a roll-off rate and/or a transition band and/or a ripple as the characteristic value of the tunable filter unit. So, the complexity of the filter unit may be adjusted by the control signal in order to adapt the filter unit to a current transmission situation. Additionally or alternatively, two or more tunable filter units may receive one distinct control signal to adjust an order and/or a roll-off rate and/or a transition band and/or a ripple as the characteristic value of each of the tunable filter units. The two or more tunable filter units may be integrated in one frequency module.

The characteristic value may be provided as an increase/decrease command. The control unit is further capable of switching specific parts of a filter unit via a switching element in order to adjust a cutoff frequency.

The signal adjusting section may comprise a power level setting section. The power level setting section may have one or more power level setting units as the component(s), preferably, a plurality of power level setting units as the components. Each power setting unit may be capable of setting a gain value and/or an attenuation value as the characteristic value.

The one or more power level setting units may comprise an attenuation unit, each attenuation unit is capable of adjusting an attenuation value as the characteristic value.

Each attenuation unit may be capable of receiving a distinct control signal of the one or more control signals from the control unit to respectively set and/or adjust the attenuation value as the characteristic value.

The attenuation value to be set or to be adjusted may be an attenuation value selectable from a plurality of different (distinct) attenuation values. These attenuation values may be prestored in the circuit arrangement. Alternatively, and/or additionally, the attenuation value to be set or adjusted may be obtained by respective incrementing/decrementing commands.

The signal adjusting section may comprise a signal path activation section. The signal path activation section may have one or more activation units as the components, preferably a plurality of amplifier and/or switching units as the components. Each activation unit may be capable of activating or deactivating a distinct signal path as the characteristic value.

Signal paths, i.e. uplink and downlink signal paths, of the circuit arrangement may be activated or deactivated and thus, can comprise an activated state or a deactivated state.

In an activated state of a signal path, a signal transmission of a corresponding signal via the signal path is possible, preferably due to a signal attenuation that is not more than a predetermined amount. In other words, in an activated state of a signal path, the terminal-interface of the circuit arrangement may be connected to the antenna-interface of the circuit arrangement via this activated signal path.

In a deactivated state of a signal path, no signal transmission via the corresponding deactivated signal path may be possible, preferably due to a signal attenuation that is more than a predetermined amount. In other words, the terminal-interface of the circuit arrangement may not be connected to the antenna-interface of the circuit arrangement via this deactivated signal path. Thus, no signals, preferably highly-attenuated signals, can be transmitted via this signal path from the terminal-interface of the circuit arrangement to the antenna-interface of the circuit arrangement or vice versa.

The value for deactivating the signal path may be an attenuation value selectable from a plurality of different attenuation values. In an attenuation-value-adjusted state of a signal path, a signal transmission of a corresponding signal via the signal path is possible with a signal that is attenuated by a predetermined amount (attenuation value). In other words, in the value-attenuated state of a signal path, the terminal-interface of the circuit arrangement may be connected to the antenna-interface of the circuit arrangement and signal transmission via this signal path is value-attenuated.

The one or more power level setting units may comprise a gain amplifier unit as the component, each gain amplifier unit may be capable of adjusting the gain value as the characteristic value.

Each gain amplifier unit may be capable of receiving a distinct control signal of the one or more control signals from the control unit.

Each amplifier unit may be capable of receiving a distinct control signal of the one or more control signals from the control unit to respectively set and/or adjust the gain value as the characteristic value. The adjusting of the gain value may also include the activation or deactivation of the gain unit. Additionally, or alternatively, two or more amplifier units may receive one distinct control signal set and/or adjust the gain value as the characteristic value of each of the amplifier units. The two or more amplifier units may be integrated in one amplifier module.

The gain value may be a gain value selectable from a plurality of different (distinct) gain values. These gain values may be prestored in the circuit arrangement. Alternatively, and/or additionally, the gain value to be set or adjusted may be obtained by respective incrementing/decrementing commands. Thus, a variable gain amplifying unit for distinct signals of the plurality of signals is included in the signal adjusting section.

Gain is usually defined as the mean ratio of the signal amplitude or power at an output port to the amplitude or power at an input port. It may be desired to have a specific power or amplitude value for a specific signal, e.g. at a port of the signal adjusting section. Knowing the desired output amplitude (level) of the signal and having detected the actual amplitude value, the gain is easily calculated by a control unit and can be included in the control signal, generated by the control unit.

Although the disclosure has been illustrated and described with respect to one or more implementations, alterations and modifications will occur to others skilled in the art upon the reading and understanding of this specification and the annexed drawings. In addition, while a particular feature of the disclosure may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only and are not limiting. Numerous changes to the disclosed embodiments can be made in accordance with the disclosure herein without departing from the scope of the disclosure. Thus, the scope of the present disclosure should not be limited by any of the above described embodiments. Rather, the scope of the disclosure should be defined in accordance with the following claims.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. A circuit arrangement capable of adjusting a plurality of signals that are transmitted between a terminal and an antenna, the circuit arrangement comprising:
    a detecting unit configured to detect a signal parameter of the plurality of signals;
    a control unit configured to generate a control signal based on the detected signal parameter; and
    a signal adjusting section comprising a signal path separation unit configured to separate a common signal path for the plurality of signals into a plurality of individual signal paths,
    wherein two single signal paths of the plurality of individual signal paths are configured to carry two distinct signals of the received plurality of signals,
    wherein the signal adjusting section is configured to:
        receive the plurality of signals at a first port of the signal adjusting section;
        receive the control signal from the control unit;
        adjust a characteristic value of a component arranged in a signal path of the plurality of individual signal paths in the signal adjusting section for independently adjusting a signal parameter(s) for the two distinct signals based on the control signal to obtain a plurality of signals including the two distinct signals with the independently adjusted signal parameter(s); and provide the obtained plurality of signals including the two distinct signals with the independently adjusted signal parameter(s) to a second port of the signal adjusting section.

2. The circuit arrangement according to claim 1, wherein the received plurality of signals is a plurality of uplink radio signals, wherein the first port of the signal adjusting section is an input port for receiving the plurality of uplink radio signals generated by the terminal, and wherein the second port of the signal adjusting section is an output port for providing the obtained plurality of uplink radio signals with the independently adjusted signal parameter(s) to the antenna.

3. The circuit arrangement according to claim 1, wherein the received plurality of signals is a plurality of downlink radio signals, wherein the second port of the signal adjusting section is an input port for receiving the plurality of downlink radio signals via the antenna, and wherein the first port of the signal adjusting section is an output port for providing the obtained plurality of downlink radio signals with the independently adjusted signal parameter(s) to the terminal.

4. The circuit arrangement according to claim 1, wherein the signal adjusting section is further configured to independently adjust the signal parameter(s) for each single distinct signal subsequently.

5. The circuit arrangement according to claim 1, wherein the signal adjusting section is further configured to independently adjust the signal parameter(s) for each signal in a timely parallel manner.

6. The circuit arrangement according to claim 1, wherein the detecting unit is configured to detect the signal parameter selected from the group consisting of a frequency range, a discrete frequency value, an amplitude value, a power value, and a timing value.

7. The circuit arrangement according to claim 1, wherein the detecting unit is configured to detect a frequency range as the signal parameter, wherein the frequency range is selected from the group consisting of:
a single frequency channel in a mobile communication frequency band;
a plurality of frequency channels in a mobile communication frequency band;
a sum of frequency channels in a mobile communication frequency band;
a single mobile communication frequency band;
a plurality of mobile communication frequency bands; and
a plurality of frequency channels in a plurality of mobile communication frequency bands.

8. The circuit arrangement according to claim 1, wherein the signal adjusting section comprises a filter section, the filter section having a tunable filter unit as the component, wherein the tunable filter unit is capable of individually and independently adjusting a frequency range value as the characteristic value for two or more active distinct signals of the received plurality of signals having different coupling factors, different free space attenuation, and/or different channel properties.

9. The circuit arrangement according to claim 8, wherein the tunable filter unit is configured to receive a distinct control signal from the control unit to adjust a value of the frequency range value.

10. The circuit arrangement according to claim 9, wherein the component arranged in the signal path of the plurality of individual signal paths is adjusted by adjusting one of the following characteristic values:

a minimum cutoff frequency of one of the tunable filter units;
a maximum cutoff frequency of one of the tunable filter units;
a bandwidth value of one of the tunable filter units; and
an order of one of the tunable filter units.

11. The circuit arrangement according to claim 1, wherein the signal adjusting section comprises a power level setting section, the power level setting section having a power level setting unit as the component, wherein the power level setting unit is capable of setting a gain value and/or an attenuation value as the characteristic value.

12. The circuit arrangement according to claim 11, wherein the power level setting unit comprise an attenuation unit as the component, the attenuation unit configured to individually and independently adjust the attenuation value as the characteristic value for two or more active distinct signals of the received plurality of signals having different coupling factors, different free space attenuation, and/or different channel properties.

13. The circuit arrangement according to claim 12, wherein the attenuation unit is configured to receive a distinct control signal from the control unit to set the attenuation value.

14. The circuit arrangement according to claim 11, wherein the attenuation value is selectable from a plurality of different attenuation values and/or wherein the gain value is a gain value selectable from a plurality of different gain values.

15. The circuit arrangement according to claim 11, wherein the power level setting unit comprise a gain amplifier unit as the component, wherein the gain amplifier unit is configured to individually and independently adjust the gain value as the characteristic value for two or more active distinct signals of the received plurality of signals having different coupling factors, different free space attenuation, and/or different channel properties.

16. The circuit arrangement according to claim 15, wherein the gain amplifier unit is configured to receive a distinct control signal from the control unit to set the gain value.

17. The circuit arrangement according to claim 1, wherein the circuit arrangement is configured to be operable for providing a separate adjustment of more than one signal path in the circuit arrangement for data transmission in the same or in different frequency bands, which adjustment is independent of whether the signal having the signal parameter to be adjusted is an uplink signal or a downlink signal, whereby the circuit arrangement is operable for separately adjusting or regulating multiple signal paths at a time including compensating any attenuation according to corresponding signal loss(es).

18. The circuit arrangement according to claim 1, wherein a signal coupler of the detecting unit is configured to decouple a portion of the received plurality of signals to a signal parameter detector of the detecting unit to detect the signal parameter of the plurality of signals.

19. The circuit arrangement according to claim 1, wherein the signal path separation unit includes one of the following:
a multiplexer unit,
a demultiplexer unit,
a filter-bank,
a switching unit,
a frequency splitting unit,
a power splitting unit,
a switch having multi-split functionality, and
a circulator unit.

20. A method for adjusting signal parameters of a plurality of signals that are transmitted between a terminal and an antenna, wherein the method comprises the following steps:

- detecting, by a detecting unit of a circuit arrangement, a signal parameter of a plurality of signals;
- generating, by a control unit of the circuit arrangement, a control signal based on the detected signal parameter;
- receiving, by a signal adjusting section of the circuit arrangement, the plurality of signals;
- receiving, by the signal adjusting section of the circuit arrangement, the control signal from the control unit;
- separating, by a signal path separation unit as part of the signal adjusting unit of the circuit arrangement, a common signal path for the plurality of signals into a plurality of individual signal paths, wherein two signal paths of the plurality of signal paths carry two distinct signals of the received plurality of signals,
- adjusting, by the signal adjusting section of the circuit arrangement, a characteristic value of a component arranged in one of the signal paths of the plurality of individual signal paths for independently adjusting one signal parameter for the two distinct signals based on the control signal to obtain a plurality of signals including the two distinct signals with the independently adjusted signal parameter; and
- providing, by the signal adjusting section of the circuit arrangement, the obtained plurality of signals including the two distinct signals with the independently adjusted signal parameter.

* * * * *